US012795160B2

(12) United States Patent
Hooda et al.

(10) Patent No.: US 12,795,160 B2
(45) Date of Patent: Nov. 10, 2026

(54) V-DMC DISPLACEMENT LIFTING TRANSFORM

(71) Applicant: QUALCOMM Incorporated, San Diego, CA (US)

(72) Inventors: Reetu Hooda, San Diego, CA (US); Geert Van der Auwera, San Diego, CA (US); Anique Akhtar, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 18/882,516

(22) Filed: Sep. 11, 2024

(65) Prior Publication Data

US 2025/0119581 A1 Apr. 10, 2025

Related U.S. Application Data

(60) Provisional application No. 63/621,478, filed on Jan. 16, 2024, provisional application No. 63/590,679, filed on Oct. 16, 2023, provisional application No. 63/589,192, filed on Oct. 10, 2023.

(51) Int. Cl.

| | |
|---|---|
| *H04N 19/597* | (2014.01) |
| *H04N 19/18* | (2014.01) |
| *H04N 19/60* | (2014.01) |
| *H04N 19/70* | (2014.01) |

(52) U.S. Cl.

CPC ........... *H04N 19/597* (2014.11); *H04N 19/18* (2014.11); *H04N 19/60* (2014.11); *H04N 19/70* (2014.11)

(58) Field of Classification Search

None

See application file for complete search history.

(56) References Cited

U.S. PATENT DOCUMENTS

| | | | | |
|---|---|---|---|---|
| 2012/0051421 | A1 | 3/2012 | Lu et al. | |
| 2023/0290008 | A1* | 9/2023 | Mammou | G06T 15/04 |
| 2023/0412849 | A1* | 12/2023 | Huang | H04N 19/91 |

OTHER PUBLICATIONS

Calderbank A.R., et al., "Wavelet Transforms That Map Integers to Integers," Applied and Computational Harmonic Analysis 5, Article No. HA970238, 1998, pp. 332-369.

Fusell D., "Subdivision curves," University of Texas at Austin, 2010, pp. 1-20.

(Continued)

*Primary Examiner* — Christopher Braniff

(74) *Attorney, Agent, or Firm* — QUALCOMM Incorporated; Espartaco Diaz Hidalgo

(57) ABSTRACT

A device for decoding encoded mesh data is configured to receive, in a bitstream of the encoded mesh data, one or more syntax elements; determine an offset value based on the one or more syntax elements; determine a set of transform coefficients; apply the offset to the set of transform coefficients to determine a set of updated transform coefficients; inverse transform the set of updated transform coefficients to determine a set of displacement vectors; and determine a decoded mesh based on the set of displacement vectors.

30 Claims, 15 Drawing Sheets

(56) References Cited

OTHER PUBLICATIONS

Garland M., et al., "Surface Simplification Using Quadric Error Metrics," Proceedings of the 24th annual conference on Computer Graphics and Interactive Techniques, Aug. 3, 1997, 8 Pages.
Geert Van Der Auwera (Qualcomm) et al., "[V-DMC][New] On displacement vector coding," 142. MPEG Meeting, Apr. 24, 2023-Apr. 28, 2023, Antalya, (Motion Picture Expert Group or ISO/IEC JTC1/SC29/WG11), No. m63257, Apr. 27, 2023, 15 Pages, XP030310371, abstract, figure 1 Sections 1, 3, 4, 6.
Hooda R (Qualcomm) et al., "[V—DMC] [EE 4.7] Report on Test 7.5 on lifting transform for displacements," 145. MPEG Meeting, Jan. 22, 2024-Jan. 26, 2024, Online, (Motion Picture Expert Group or ISO/IEC JTC1/SC29/WG11), No. m66596, Jan. 25, 2024, pp. 1-8, XP030316093, abstract Sections 1, 2.1.
International Search Report and Written Opinion—PCT/US2024/046439—ISA/EPO—Dec. 5, 2024 15 Pages.
International Standard: "Information Technology—Coded Representation of Immersive Media—Part 9: Geometry-Based Point Cloud Compression," ISO/IEC FDIS 23090-9, Final Draft, 2022, 14 Pages.
Microsoft Learn: "Using UVAtlas (Direct 3D 9)," Jun. 8, 2021, pp. 1-9.
Sweldens W., et al., "Building Your Own Wavelets at Home," Morning Section: Introductory Material, 1996, 72 Pages.

* cited by examiner b(i) -- Compressed Bitstream
A''(i) -- Decoded Attribute Map
M''(i) -- Decoded Mesh
m''(i) -- Decoded Base Mesh
d''(i) -- Decoded Displacements

V-DMC DISPLACEMENT LIFTING TRANSFORM

This application claims the benefit of:

U.S. Provisional Patent Application No. 63/589,192, filed 10 Oct. 2023,

U.S. Provisional Patent Application No. 63/590,679, filed 16 Oct. 2023,

U.S. Provisional Patent Application No. 63/621,478, filed 16 Jan. 2024, the entire content of each being incorporated herein by reference.

TECHNICAL FIELD

This disclosure relates to video-based coding of dynamic meshes.

BACKGROUND

Meshes may be used to represent physical content of a 3-dimensional space. Meshes may have utility in a wide variety of situations. For example, meshes may be used the context of representing the physical content of an environment for purposes of positioning virtual objects in an extended reality, e.g., augmented reality (AR), virtual reality (VR), or mixed reality (MR), application. Mesh compression is a process for encoding and decoding meshes. Encoding meshes may reduce the amount of data required for storage and transmission of the meshes.

SUMMARY

The techniques of this disclosure relate to video-based coding of dynamic meshes (V-DMC) and, more specifically, to the signaling of displacement vectors. As will be explained in more detail below, a V-DMC encoder may be configured to transform values for the displacement vectors, e.g., using a wavelet transform with a lifting scheme, to generate a set of transform coefficients corresponding to a dimension (e.g., X, Y, or Z) of the set of transform coefficients. The lifting scheme, however, may introduce a bias into the transform coefficients. In this context, a bias refers to the mean of the values from the lifting transform being different than zero.

According to the techniques of this disclosure, a V-DMC encoder may be configured to determine an amount of bias in the transform coefficients, determine an offset based on the amount of bias, and subtract the offset from the transform coefficients to determine bias-adjusted transform coefficients. In most coding scenarios, the bias adjustment causes the bias-adjusted transform coefficients to have more values equal to or closer to zero and reduces the average magnitude of the values. The video encoder may then quantize the bias-adjusted transform coefficients rather than the original transform coefficients. By having more values equal to or close to zero, the values can be signaled with fewer bits and with reduced quantization error, which can improve the overall rate-distortion tradeoff obtained by the encoding and decoding processes.

The V-DMC encoder may also signal to a V-DMC decoder an indication of the offset value used during the encoding process. Thus, after the V-DMC decoder dequantizes the bias-adjusted transform coefficients, the V-DMC decoder may add the offset to the dequantized bias-adjusted transform coefficients to essentially add the bias and obtain a decoded version of the original transform coefficients. As the quantization and dequantization process may be lossy, the decoded version of the original transform coefficients may not exactly match the original transform coefficients determined by the V-DMC encoder. The V-DMC decoder may then apply an inverse of the transform applied by the V-DMC encoder, e.g., an inverse of the wavelet transform with the lifting scheme, to determine a decoded version of the displacement vectors. Although the techniques of this disclosure may be applied to any component of a displacement vector, it has been observed that the described techniques may be particularly beneficial when used for the normal component, typically identified as the x-component, of the normal vector.

According to an example of this disclosure, a device for decoding encoded mesh data includes a memory; processing circuitry coupled to the memory and configured to: receive, in a bitstream of the encoded mesh data, one or more syntax elements; determine an offset value based on the one or more syntax elements; determine a set of transform coefficients; apply the offset to the set of transform coefficients to determine a set of updated transform coefficients; inverse transform the set of updated transform coefficients to determine a set of displacement vectors; and determine a decoded mesh based on the set of displacement vectors.

According to an example of this disclosure, a method of decoding encoded mesh data includes receiving, in a bitstream of the encoded mesh data, one or more syntax elements; determining an offset value based on the one or more syntax elements; determining a set of transform coefficients; applying the offset to the set of transform coefficients to determine a set of updated transform coefficients; inverse transforming the set of updated transform coefficients to determine a set of displacement vectors; and determining a decoded mesh based on the set of displacement vectors. According to an example of this disclosure, a device for encoding mesh data includes a memory; processing circuitry coupled to the memory and configured to: determine a set of displacement vectors for the mesh data; transform the set of displacement vectors to determine a set of transform coefficients; determine a bias value for the set of transform coefficients; determine an offset value based on the bias value for the set of transform coefficients; subtract the offset value from the set of transform coefficients to determined bias-adjusted transform coefficients; quantize the bias-adjusted transform coefficients to determine quantized coefficients; and signal a in a bitstream of encoded mesh data the quantized coefficients and an indication of the offset.

According to an example of this disclosure, a method of encoding mesh data includes determining a set of displacement vectors for the mesh data; transforming the set of displacement vectors to determine a set of transform coefficients; determining a bias value for the set of transform coefficients; determining an offset value based on the bias value for the set of transform coefficients; subtracting the offset value from the set of transform coefficients to determined bias-adjusted transform coefficients; quantizing the bias-adjusted transform coefficients to determine quantized coefficients; and signaling a in a bitstream of encoded mesh data the quantized coefficients and an indication of the offset.

The details of one or more examples are set forth in the accompanying drawings and the description below. Other features, objects, and advantages will be apparent from the description, drawings, and claims.

DETAILED DESCRIPTION

Figure 1:
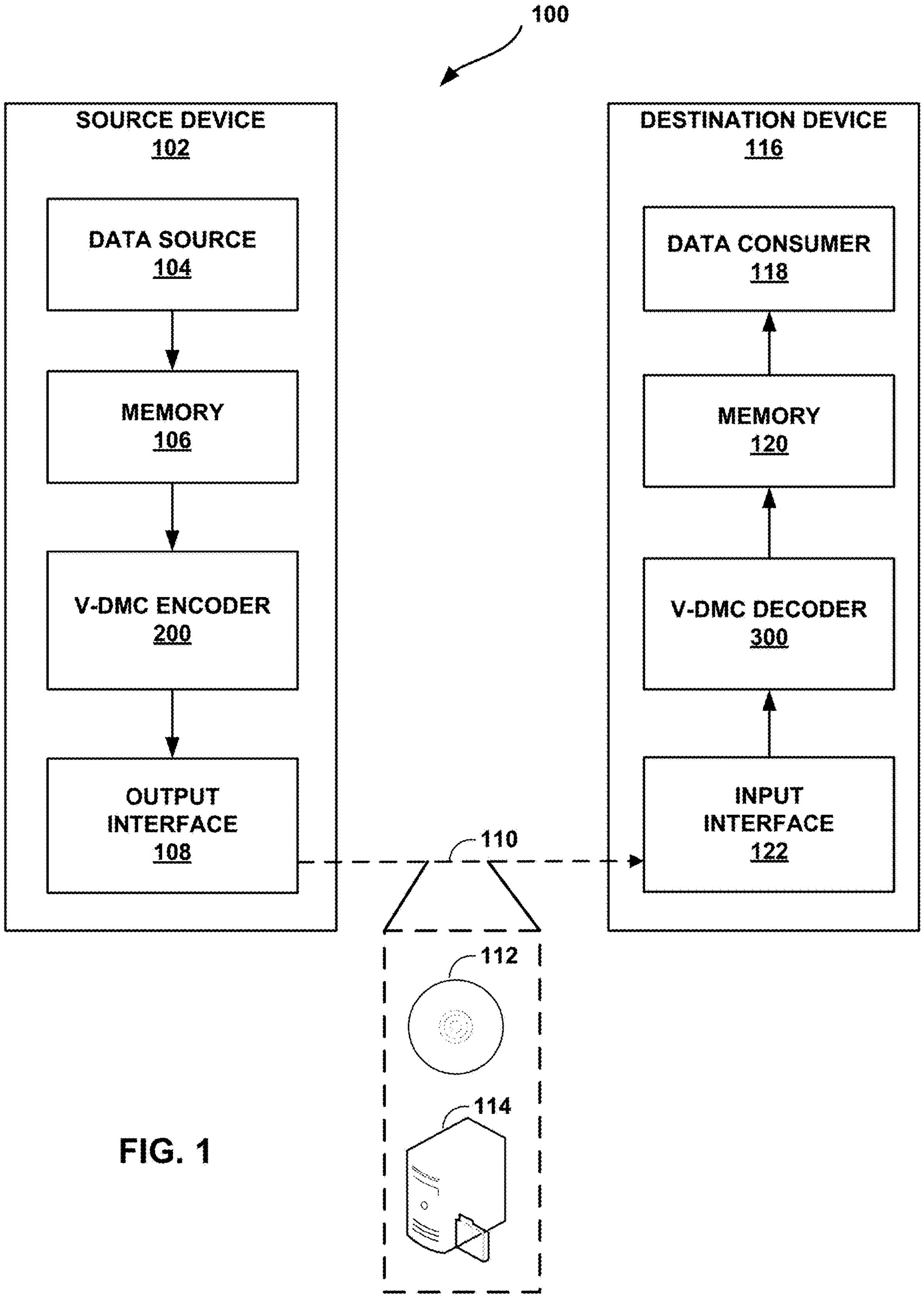
FIG. 1 is a block diagram illustrating an example encoding and decoding system that may perform the techniques of this disclosure.

A mesh generally refers to a collection of vertices in a three-dimensional (3D) space that collectively represent one or multiple objects in the 3D space. The vertices are connected by edges, and the edges form polygons, which form faces of the mesh. Each vertex may also have one or more associated attributes, such as a texture or a color. In most scenarios, having more vertices produces higher quality, e.g., more detailed and more realistic, meshes. Having more vertices, however, also requires more data to represent the mesh.

To reduce the amount of data needed to represent the mesh, the mesh may be encoded using lossy or lossless encoding. In lossless encoding, the decoded version of the encoded mesh exactly matches the original mesh. In lossy encoding, by contrast, the process of encoding and decoding the mesh causes loss, such as distortion, in the decoded version of the encoded mesh.

In one example of a lossy encoding technique for meshes, a mesh encoder decimates an original mesh to determine a base mesh. To decimate the original mesh, the mesh encoder subsamples or otherwise reduces the number of vertices in the original mesh, such that the base mesh is a rough approximation, with fewer vertices, of the original mesh. The mesh encoder then subdivides the decimated mesh. That is the mesh encoder estimates the locations of additional vertices in between the vertices of the base mesh. The mesh encoder then deforms the subdivided mesh by moving the vertices in a manner that makes the deformed mesh more closely match the original mesh.

After determining a desired base mesh and deformation of the subdivided mesh, the mesh encoder generates a bitstream that includes data for constructing the base mesh and data for performing the deformation. The data defining the deformation may be signaled as a series of displacement vectors that indicate the movement, or displacement, of the additional vertices determined by the subdividing process. To decode a mesh from the bitstream, a mesh decoder reconstructs the base mesh based on the signaled information, applies the same subdivision process as the mesh encoder, and then displaces the additional vertices based on the signaled displacement vectors.

The techniques of this disclosure relate to the signaling of displacement vectors for video-based coding of dynamic meshes (V-DMC). As will be explained in more detail below, a V-DMC encoder may be configured to transform values for the displacement vectors, e.g., using a wavelet transform with a lifting scheme, to generate a set of transform coefficients corresponding to a dimension (e.g., X, Y, or Z) of the set of transform coefficients. The lifting scheme, however, may introduce a bias into the transform coefficients. In this context, a bias refers to the mean of the values from the lifting transform being different than zero.

According to the techniques of this disclosure, a V-DMC encoder may be configured to determine an amount of bias in the transform coefficients, determine an offset based on the amount of bias, and subtract the offset from the transform coefficients to determine bias-adjusted transform coefficients. In most coding scenarios, the bias adjustment causes the bias-adjusted transform coefficients to have more values equal to or closer to zero and reduces the average magnitude of the values. The video encoder may then quantize the bias-adjusted transform coefficients rather than the original transform coefficients. By having more values equal to or close to zero, the values can be signaled with fewer bits and with reduced quantization error, which can improve the overall rate-distortion tradeoff obtained by the encoding and decoding processes.

The V-DMC encoder may also signal to a V-DMC decoder an indication of the offset value used during the encoding process. Thus, after the V-DMC decoder dequantizes the bias-adjusted transform coefficients, the V-DMC decoder may add the offset to the dequantized bias-adjusted transform coefficients to essentially add the bias and obtain a decoded version of the original transform coefficients. As the quantization and dequantization process may be lossy, the decoded version of the original transform coefficients may not exactly match the original transform coefficients determined by the V-DMC encoder. The V-DMC decoder may then apply an inverse of the transform applied by the V-DMC encoder, e.g., an inverse of the wavelet transform with the lifting scheme, to determine a decoded version of the displacement vectors. Although the techniques of this disclosure may be applied to any component of a displacement vector, it has been observed that the described techniques may be particularly beneficial when used for the normal component, typically identified as the x-component, of the normal vector.

FIG. 1 is a block diagram illustrating an example encoding and decoding system 100 that may perform the techniques of this disclosure. The techniques of this disclosure are generally directed to coding (encoding and/or decoding) meshes. The coding may be effective in compressing and/or decompressing data of the meshes.

As shown in FIG. 1, system 100 includes a source device 102 and a destination device 116. Source device 102 provides encoded data to be decoded by a destination device 116. Particularly, in the example of FIG. 1, source device 102 provides the data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a V-DMC encoder 200, and an output interface 108. Destination device 116 includes an input interface 122, a V-DMC decoder 300, a memory 120, and a data consumer 118. In accordance with this disclosure, V-DMC encoder 200 of source device 102 and V-DMC decoder 300 of destination device 116 may be configured to apply the techniques of this disclosure related to displacement vector quantization. Thus, source device 102 represents an example of an encoding device, while destination device 116 represents an example of a decoding device. In other examples, source device 102 and destination device 116 may include other components or arrangements. For example, source device 102 may receive data from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to displacement vector quantization. Source device 102 and destination device 116 are merely examples of such devices in which source device 102 generates coded data for transmission to destination device 116. This disclosure refers to a "coding" device as a device that performs coding (encoding and/or decoding) of data. Thus, V-DMC encoder 200 and V-DMC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (e.g., raw, unencoded data) and may provide a sequential series of "frames" of the data to V-DMC encoder 200, which encodes data for the frames. Data source 104 may, for example, execute a framework or platform for generating graphics for video games, augmented reality, simulations, or any other such use case. Data source 104 of source device 102 may include a graphics engine that generates raw mesh data from any combination of one or more sensors configured to obtain real-world data. Examples of such sensors include cameras, 2D scanners, 3D scanners, light detection and ranging (LIDAR) devices, video cameras, ultrasonic sensors, infrared sensors, inertial measurement sensors, sonar sensors, pressure sensors, thermal imaging sensors, magnetic sensors, laser range finders, photodetectors, and the like. In other examples, the graphics engine may generate meshes that are entirely computer generated, i.e., not representative of a real world scene, using modeling, simulation, animation, generative adversarial networks, and the like. In yet other examples, data source 104 may not include a graphics engine, but instead, may obtain the mesh data from a storage unit or other device.

Regardless of whether the mesh data is based on real-world sensor data, entirely computer generated, obtained from an external source, or some combination thereof, V-DMC encoder 200 encodes the mesh data. V-DMC encoder 200 may rearrange the frames from the received order (sometimes referred to as "display order") into a coding order for coding. V-DMC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from V-DMC decoder 300. Additionally or alternatively, memory 106 and memory 120 may store software instructions executable by, e.g., V-DMC encoder 200 and V-DMC decoder 300, respectively. Although memory 106 and memory 120 are shown separately from V-DMC encoder 200 and V-DMC decoder 300 in this example, it should be understood that V-DMC encoder 200 and V-DMC decoder 300 may also include internal memories for functionally similar or equivalent purposes. Furthermore, memory 106 and memory 120 may store encoded data, e.g., output from V-DMC encoder 200 and input to V-DMC decoder 300. In some examples, portions of memory 106 and memory 120 may be allocated as one or more buffers, e.g., to store raw, decoded, and/or encoded data. For instance, memory 106 and memory 120 may store data representing a mesh.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to V-DMC encoder 200 and/or output interface 108, and destination device 116 may include an SoC device to perform the functionality attributed to V-DMC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by V-DMC encoder 200, which is also used by V-DMC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on meshes.

V-DMC encoder 200 and V-DMC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of V-DMC encoder 200 and V-DMC decoder 300 may be included in one or more encoders or decoders, either of which may be integrated as part of a combined encoder/decoder (CODEC) in a respective device. A device including V-DMC encoder 200 and/or V-DMC decoder 300 may comprise one or more integrated circuits, microprocessors, and/or other types of devices.

V-DMC encoder 200 and V-DMC decoder 300 may operate according to a coding standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, V-DMC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure addresses various improvements of the displacement vector quantization process in the video-based coding of dynamic meshes (V-DMC) technology that is being standardized in MPEG WG7 (3DGH).

The MPEG working group 6 (WG7), also known as the 3D graphics and haptics coding group (3DGH), is currently standardizing the video-based coding of dynamic mesh representations (V-DMC) targeting XR use cases. The current test model is based on the call for proposals result, Khaled Mammou, Jungsun Kim, Alexandros Tourapis, Dimitri Podborski, Krasimir Kolarov, [V-CG] Apple's Dynamic Mesh Coding CfP Response, ISO/IEC JTC1/SC29/WG7, m59281, April 2022, and encompasses the pre-processing of the input meshes into approximated meshes with typically fewer vertices named the base meshes, which are coded with a static mesh coder (cfr. Draco, etc.). In addition, the encoder may estimate the motion of the base mesh vertices and code the motion vectors into the bitstream. The reconstructed base meshes may be subdivided into finer meshes with additional vertices and, hence, additional triangles. The encoder may refine the positions of the subdivided mesh vertices to approximate the original mesh. The refinements or vertex displacement vectors may be coded into the bitstream. In the current test model, the displacement vectors are wavelet transformed, quantized, and the coefficients are packed into a 2D frame. The sequence of frames is coded with a typical video coder, for example, HEVC or VVC, into the bitstream. In addition, the sequence of texture frames is coded with a video coder.

Figure 2:
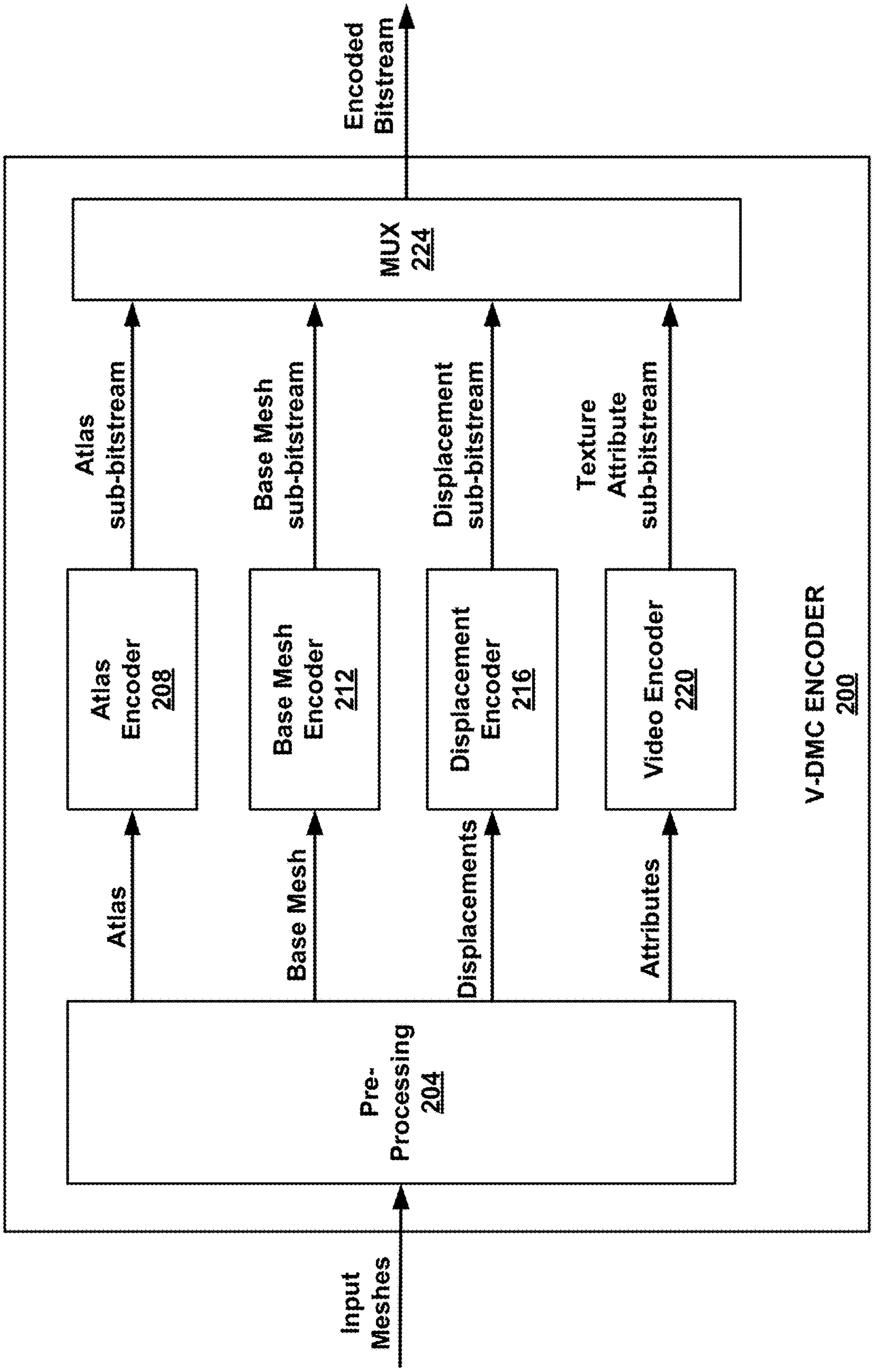
FIG. 2 shows an example implementation of a V-DMC encoder.
Figure 3:
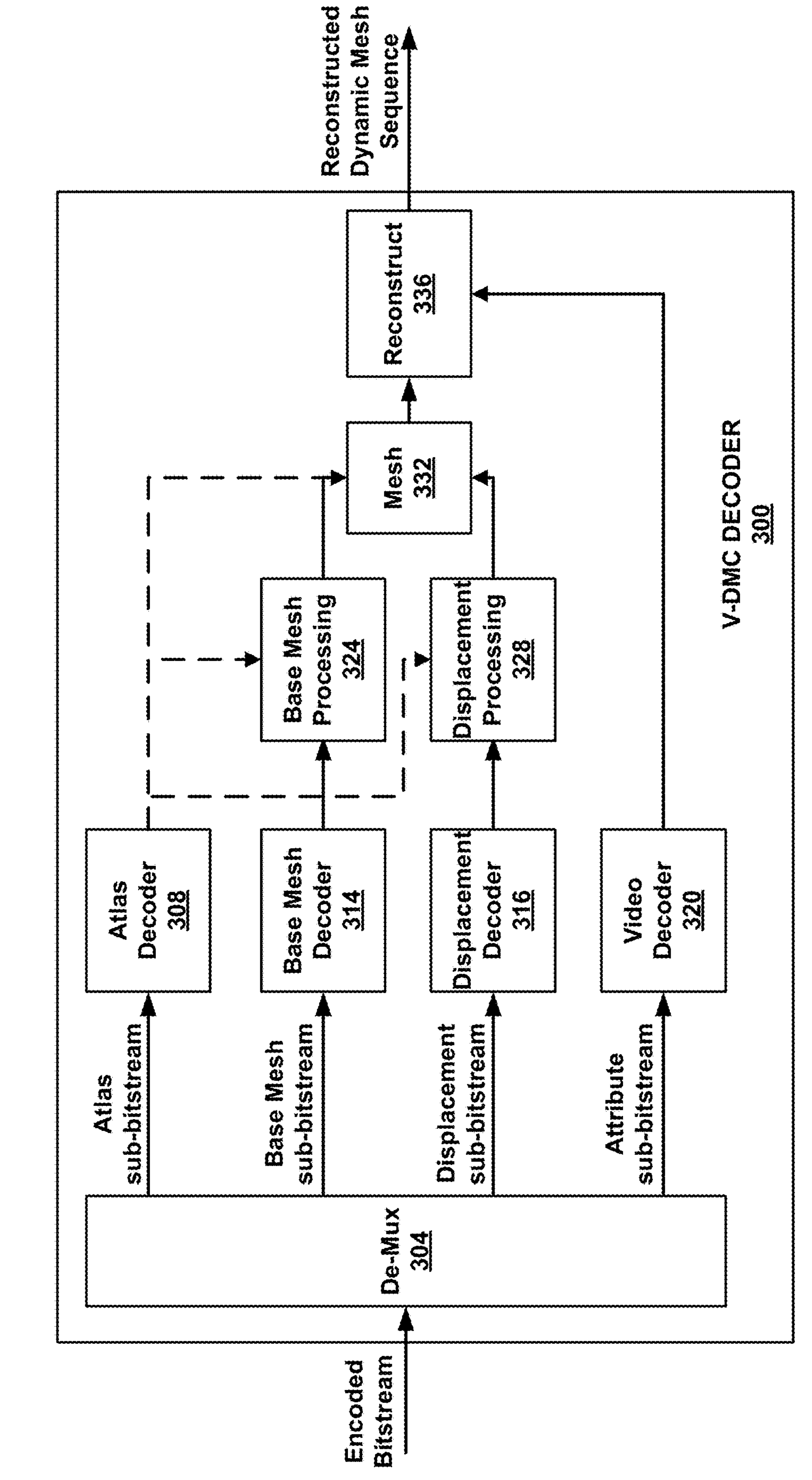
FIG. 3 shows an example implementation of a V-DMC decoder.

FIGS. 2 and 3 show the overall system model for the current V-DMC test model™ encoder (V-DM encoder 200 in FIG. 2) and decoder (V-DMC decoder 300 in FIG. 3) architecture. V-DMC encoder 200 performs volumetric media conversion, and V-DMC decoder 300 performs a corresponding reconstruction. The 3D media is converted to a series of sub-bitstreams: base mesh, displacement, and texture attributes. Additional atlas information is also included in the bitstream to enable inverse reconstruction, as described in N00680.

FIG. 2 shows an example implementation of V-DMC encoder 200. In the example of FIG. 2, V-DMC encoder 200 includes pre-processing unit 204, atlas encoder 208, base mesh encoder 212, displacement encoder 216, and video encoder 220. Pre-processing unit 204 receives an input mesh sequence and generates a base mesh, the displacement vectors, and the texture attribute maps. Base mesh encoder 212 encodes the base mesh. Displacement encoder 216 encodes the displacement vectors, for example as V3C video components or using arithmetic displacement coding. Video encoder 220 encodes the texture attribute components, e.g., texture or material information, using any video codec, such as the High Efficiency Video Coding (HEVC) Standard or the Versatile Video Coding (VVC) standard.

Aspects of V-DMC encoder 200 will now be described in more detail. Pre-processing unit 204 represents the 3D volumetric data as a set of base meshes and corresponding refinement components. This is achieved through a conversion of input dynamic mesh representations into a number of V3C components: a base mesh, a set of displacements, a 2D representation of the texture map, and an atlas. The base mesh component is a simplified low-resolution approximation of the original mesh in the lossy compression and is the original mesh in the lossless compression. The base mesh component can be encoded by base mesh encoder 212 using any mesh codec.

Figure 4:
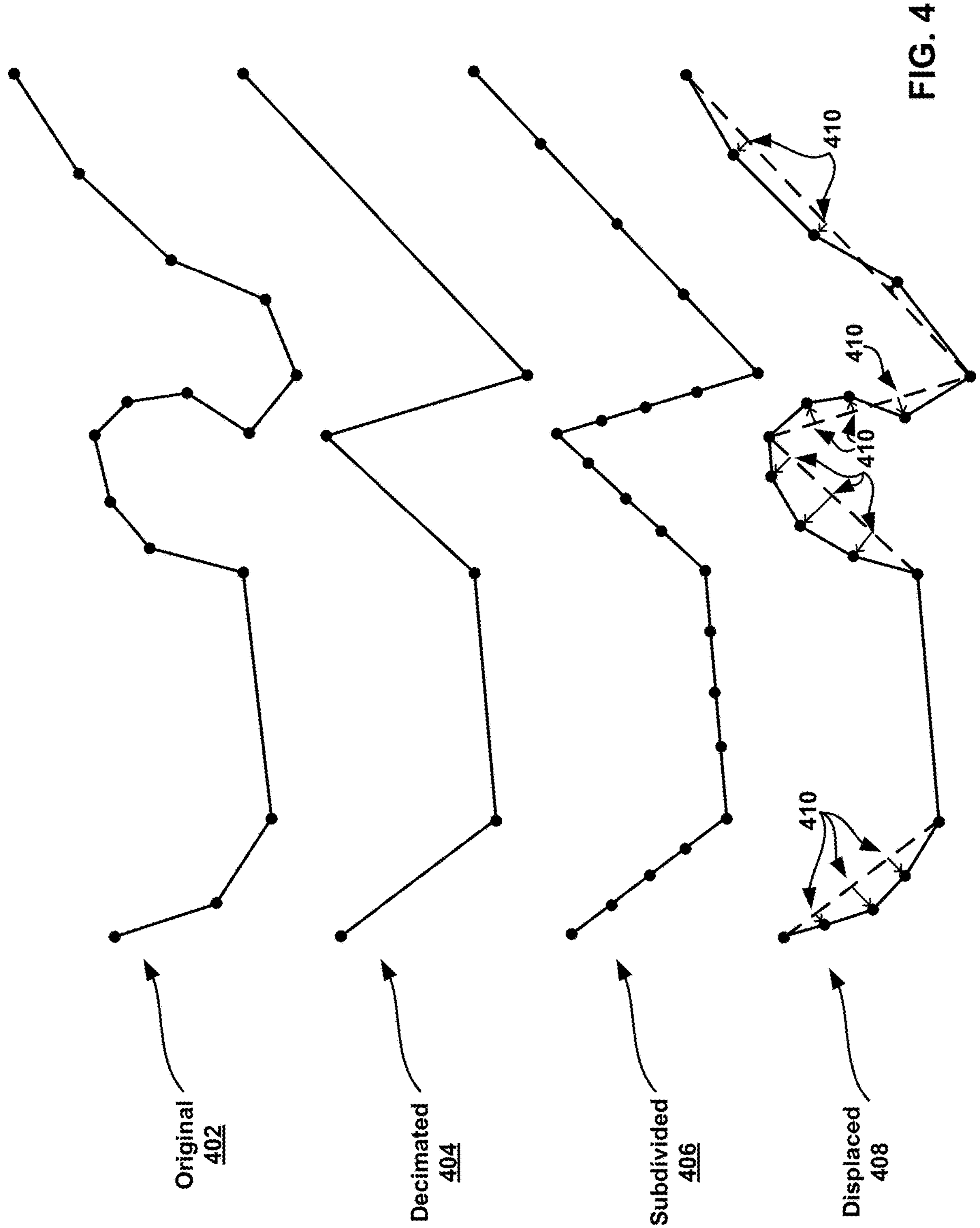
FIG. 4 shows an example of resampling to enable efficient compression of a 2D curve.

Base mesh encoder 212 is represented as Static Mesh Encoder in FIG. 4 and employs an implementation of the Edgebreaker algorithm, e.g., m63344, for encoding the base mesh where the connectivity is encoded using a CLERS op code, e.g., from Rossignac and Lopes, and the residual of the attribute is encoded using prediction from the previously encoded/decoded vertices' attributes.

Aspects of base mesh encoder 212 will now be described in more detail. One or more submeshes are input to base mesh encoder 212. Submeshes are generated by pre-processing unit 204. Submeshes are generated from original meshes by utilizing semantic segmentation. Each base mesh may include of one or more submeshes.

Base mesh encoder 212 may process connected components. Connected components include of a cluster of triangles that are connected by their neighbors. A submesh can have one or more connected components. Base mesh encoder 212 may encode one "connected component" at a time for connectivity and attributes encoding and then performs entropy encoding on all "connected components".

Base mesh encoder 212 defines and categorizes the input basemesh into the connectivity and attributes. The geometry and texture coordinates (UV coordinates) are categorized as attributes.

FIG. 3 shows an example implementation of V-DMC decoder 300. In the example of FIG. 3, V-DMC decoder 300 includes demultiplexer 304, atlas decoder 308, base mesh decoder 314, displacement decoder 316, video decoder 320, base mesh processing unit 324, displacement processing unit 328, mesh generation unit 332, and reconstruction unit 336.

Demultiplexer 304 separates the encoded bitstream into an atlas sub-bitstream, a base-mesh sub-bitstream, a displacement sub-bitstream, and a texture attribute sub-bitstream. Atlas decoder 308 decodes the atlas sub-bitstream to determine the atlas information to enable inverse reconstruction. Base mesh decoder 314 decodes the base mesh sub-bitstream, and base mesh processing unit 324 reconstructs the base mesh. Displacement decoder 316 decodes the displacement sub-bitstream, and displacement processing unit 328 reconstructs the displacement vectors. Mesh generation unit 332 modifies the base mesh based on the displacement vector to form a displaced mesh.

Video decoder 320 decodes the texture attribute sub-bitstream to determine the texture attribute map, and reconstruction unit 336 associates the texture attributes with the displaced mesh to form a reconstructed dynamic mesh.

A detailed description of the proposal that was selected as the starting point for the V-DMC standardization can be found in m59281. The following description will detail the displacement vector coding in the current V-DMC test model and WD 2.0.

Figure 6:
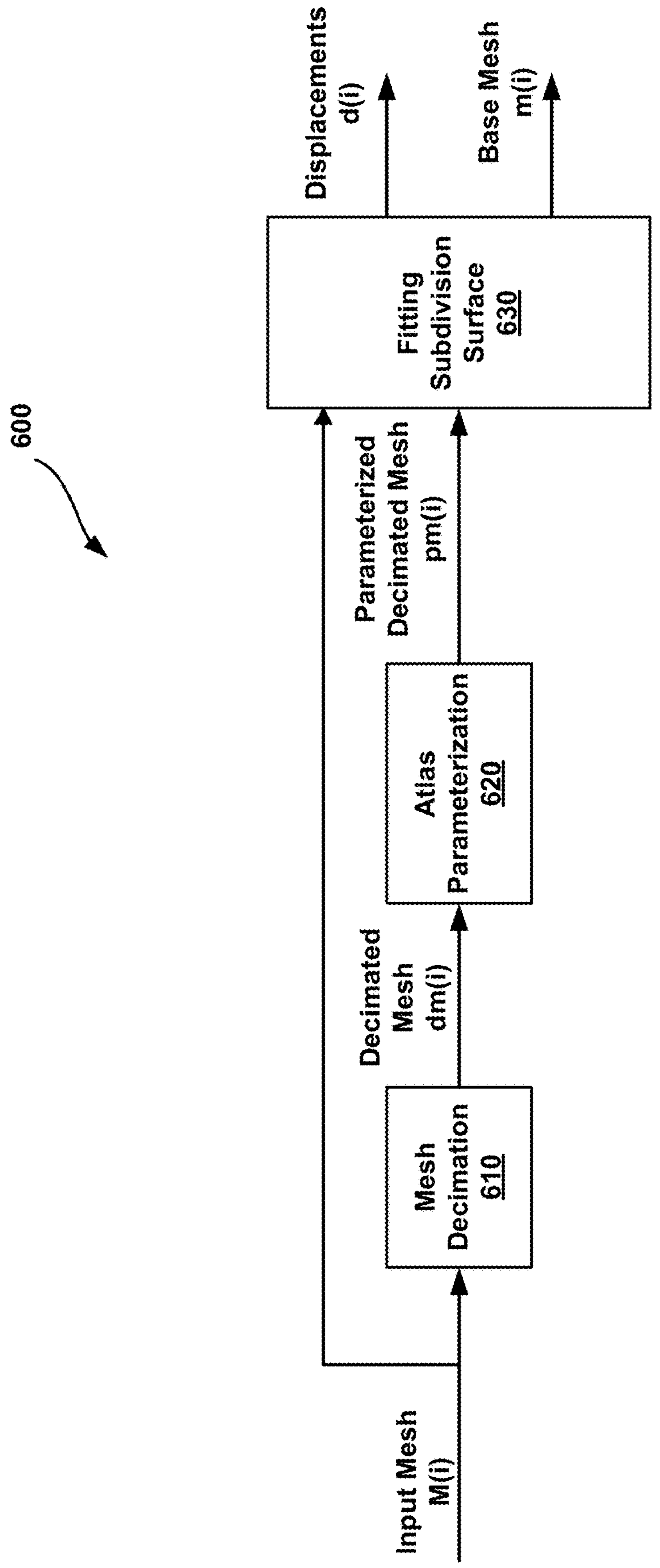
FIG. 6 shows a block diagram of a pre-processing system.

A pre-processing system, such as pre-processing system 600 described with respect to FIG. 6, may be configured to perform preprocessing on an input mesh M(i). FIG. 4 illustrates the basic idea behind the proposed pre-processing scheme using a 2D curve. The same concepts may be applied to the input 3D mesh M(i) to produce a base mesh m(i) and a displacement field d(i).

In FIG. 4, the input 2D curve (represented by a 2D polyline), referred to as original curve 402, is first downsampled to generate a base curve/polyline, referred to as the decimated curve 404. A subdivision scheme, such as that described in Garland et al, Surface Simplification Using Quadric Error Metrics (https://www.cs.cmu.edu/~garland/Papers/quadrics.pdf), is then applied to the decimated polyline to generate a subdivided curve 406. For instance, in FIG. 4, a subdivision scheme using an iterative interpolation scheme is applied. The subdivision scheme inserts at each iteration a new point in the middle of each edge of the polyline. In the example illustrated, two subdivision iterations were applied.

Figure 5:
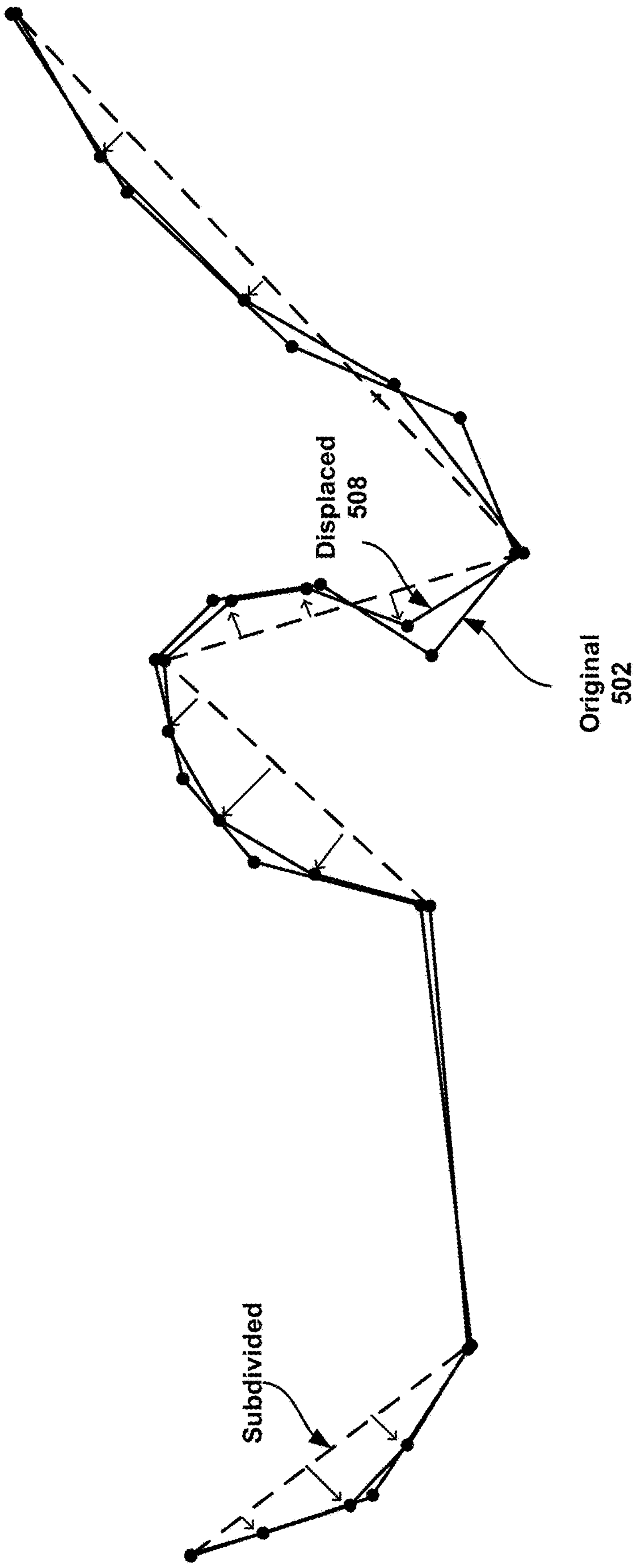
FIG. 5 shows a displaced curve that has a subdivision structure, while approximating the shape of the original mesh.

The proposed scheme is independent of the chosen subdivision scheme and may be combined with other subdivision schemes. The subdivided polyline is then deformed, or displaced, to get a better approximation of the original curve. This better approximation is displaced curve 408 in FIG. 4. Displacement vectors (arrows 410 in FIG. 4) are computed for each vertex of the subdivided mesh such that the shape of the displaced curve is as close as possible to the shape of the original curve (see FIG. 5). As illustrated by portion 508 of displaced curve 408 and portion 502 of original curve 402, for example, the displaced curve may not perfectly match the original curve.

An advantage of the subdivided curve is that the subdivided curve may have a subdivision structure that allows for efficient compression, while offering a faithful approximation of the original curve. The compression efficiency is obtained thanks to the following properties:

- The decimated/base curve has a low number of vertices and requires a limited number of bits to be encoded/transmitted.
- The subdivided curve is automatically generated by the decoder once the base/decimated curve is decoded (i.e., no need for any information other than the subdivision scheme type and subdivision iteration count).
- The displaced curve is generated by decoding the displacement vectors associated with the subdivided curve vertices. Besides allowing for spatial/quality scalability, the subdivision structure enables efficient transforms such as wavelet decomposition, which can offer high compression performance.

FIG. 6 shows a block diagram of pre-processing system 600 which may be included in V-DMC encoder 200 or may be separate from V-DMC encoder 200. Pre-processing system 600 represents an example implementation of pre-processing unit 204 as described with respect to FIG. 2. In the example of FIG. 6, pre-processing system 600 includes mesh decimation unit 610, atlas parameterization unit 620, and subdivision surface fitting unit 630.

Mesh decimation unit 610 uses a simplification technique to decimate the input mesh M(i) and produce the decimated mesh dm(i). The decimated mesh dm(i) is then re-parameterized by atlas parameterization unit 620, which may for example use the UVAtlas tool. The generated mesh is denoted as pm(i). The UVAtlas tool considers only the geometry information of the decimated mesh dm(i) when computing the atlas parameterization, which is likely sub-optimal for compression purposes. Better parameterization schemes or tools may also be considered with the proposed framework.

Applying re-parameterization to the input mesh makes it possible to generate a lower number of patches. This reduces parameterization discontinuities and may lead to better RD performance. Subdivision surface fitting unit 630 takes as input the re-parameterized mesh pm(i) and the input mesh M(i) and produces the base mesh m(i) together with a set of displacements d(i). First, pm(i) is subdivided by applying the subdivision scheme. The displacement field d(i) is computed by determining for each vertex of the subdivided mesh the nearest point on the surface of the original mesh M(i).

For the Random Access (RA) condition, a temporally consistent re-meshing may be computed by considering the base mesh m(j) of a reference frame with index j as the input for subdivision surface fitting unit 630. This makes it possible to produce the same subdivision structure for the current mesh M'(i) as the one computed for the reference mesh M'(j). Such a re-meshing process makes it possible to skip the encoding of the base mesh m(i) and re-use the base mesh m(j) associated with the reference frame M(j). This may also enable better temporal prediction for both the attribute and geometry information. More precisely, a motion field f(i) describing how to move the vertices of m(j) to match the positions of m(i) is computed and encoded. Note that such time-consistent re-meshing is not always possible. The proposed system compares the distortion obtained with and without the temporal consistency constraint and chooses the mode that offers the best RD compromise.

Note that the pre-processing system is not normative and may be replaced by any other system that produces displaced subdivision surfaces. A possible efficient implementation would constrain the 3D reconstruction unit to directly generate displaced subdivision surface and avoids the need for such pre-processing.

V-DMC encoder 200 and V-DMC decoder 300 may be configured to perform displacements coding. Depending on the application and the targeted bitrate/visual quality, the encoder may optionally encode a set of displacement vectors associated with the subdivided mesh vertices, referred to as the displacement field d(i), as described in this section.

Figure 7:
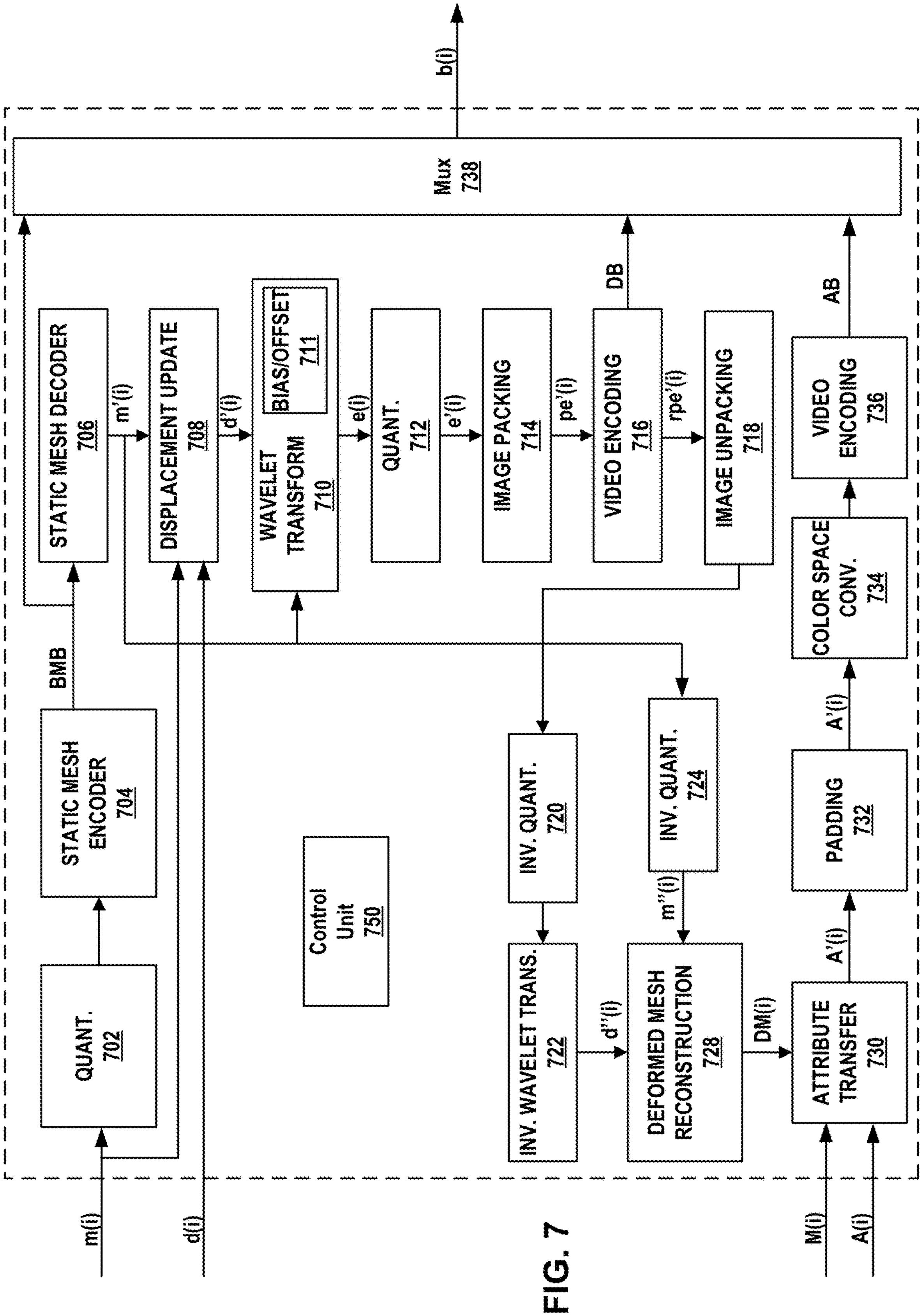
FIG. 7 shows an example of a V-DMC intra frame encoder.

FIG. 7 shows V-DMC encoder 700, which is configure to implement an intra encoding process. V-DMC encoder 700 represents an example implementation of V-DMC encoder 200.

FIG. 7 includes the following abbreviations:

m(i)—Base mesh
d(i)—Displacements
m''(i)—Reconstructed Base Mesh
d''(i)—Reconstructed Displacements
A(i)—Attribute Map
A'(i)—Updated Attribute Map
M(i)—Static/Dynamic Mesh
DM(i)—Reconstructed Deformed Mesh
m'(i)—Reconstructed Quantized Base Mesh
d'(i)—Updated Displacements
e(i)—Wavelet Coefficients
e'(i)—Quantized Wavelet Coefficients
pe'(i)—Packed Quantized Wavelet Coefficients
rpe'(i)—Reconstructed Packed Quantized Wavelet Coefficients
AB—Compressed attribute bitstream
DB—Compressed displacement bitstream
BMB—Compressed base mesh bitstream V-DMC encoder 200 receives base mesh m(i) and displacements d(i), for example from pre-processing system 600 of FIG. 6. V-DMC encoder 200 also retrieves mesh M(i) and attribute map A(i).

Quantization unit 702 quantizes the base mesh, and static mesh encoder 704 encodes the quantized based mesh to generate a compressed base mesh bitstream.

Displacement update unit 708 uses the reconstructed quantized base mesh m'(i) to update the displacement field d(i) to generate an updated displacement field d'(i). This process considers the differences between the reconstructed base mesh m'(i) and the original base mesh m(i). By exploiting the subdivision surface mesh structure, wavelet transform unit 710 applies a wavelet transform to d'(i) to generate a set of wavelet coefficients. The scheme is generally agnostic to the transform applied and may leverage any other transform, including the identity transform. In accordance with the techniques of this disclosure, transform unit 710 includes a bias/offset determination unit 711. Bias/offset determination unit 711 may be configured to transform a set of displacement vectors to determine a set of transform coefficients; determine a bias value for the set of transform coefficients; determine an offset value based on the bias value for the set of transform coefficients; and subtract the offset value from the set of transform coefficients to determined bias-adjusted transform coefficients.

Quantization unit 712 quantizes wavelet coefficients, e.g., the bias-adjusted transform coefficients determined by bias/offset determination unit 711, and image packing unit 714 packs the quantized wavelet coefficients into a 2D image/video that can be compressed using a traditional image/video encoder in the same spirit as V-PCC to generate a displacement bitstream.

Attribute transfer unit 730 converts the original attribute map A(i) to an updated attribute map that corresponds to the reconstructed deformed mesh DM(i). Padding unit 732 pads the updated attributed map by, for example, filling patches of the frame that have empty samples with interpolated samples that may improve coding efficiency and reduce artifacts. Color space conversion unit 734 converts the attribute map into a different color space, and video encoding unit 736 encodes the updated attribute map in the new color space, using for example a video codec, to generate an attribute bitstream.

Multiplexer 738 combines the compressed attribute bitstream, compressed displacement bitstream, and compressed base mesh bitstream into a single compressed bitstream.

Image unpacking unit 718 and inverse quantization unit 720 apply image unpacking and inverse quantization to the reconstructed packed quantized wavelet coefficients generated by video encoding unit 716 to obtain the reconstructed version of the wavelet coefficients. Inverse wavelet transform unit 722 applies and inverse wavelet transform to the reconstructed wavelet coefficient to determine reconstructed displacements d''(i).

Inverse quantization unit 724 applies an inverse quantization to the reconstructed quantized base mesh m'(i) to obtain a reconstructed base mesh m"(i). Deformed mesh reconstruction unit 728 subdivides m"(i) and applies the reconstructed displacements d"(i) to its vertices to obtain the reconstructed deformed mesh DM(i).

Image unpacking unit 718, inverse quantization unit 720, inverse wavelet transform unit 722, and deformed mesh reconstruction unit 728 represent a displacement decoding loop. Inverse quantization unit 724 and deformed mesh reconstruction unit 728 represent a base mesh decoding loop. V-DMC encoder 700 includes the displacement decoding loop and the base mesh decoding loop so that V-DMC encoder 700 can make encoding decisions, such as determining an acceptable rate-distortion tradeoff, based on the same decoded mesh that a mesh decoder will generate, which may include distortion due to the quantization and transforms. V-DMC encoder 700 may also use decoded versions of the base mesh, reconstructed mesh, and displacements for encoding subsequent base meshes and displacements.

Control unit 750 generally represents the decision making functionality of V-DMC encoder 700. During an encoding process, control unit 750 may, for example, make determinations with respect to mode selection, rate allocation, quality control, and other such decisions.

Figure 8:
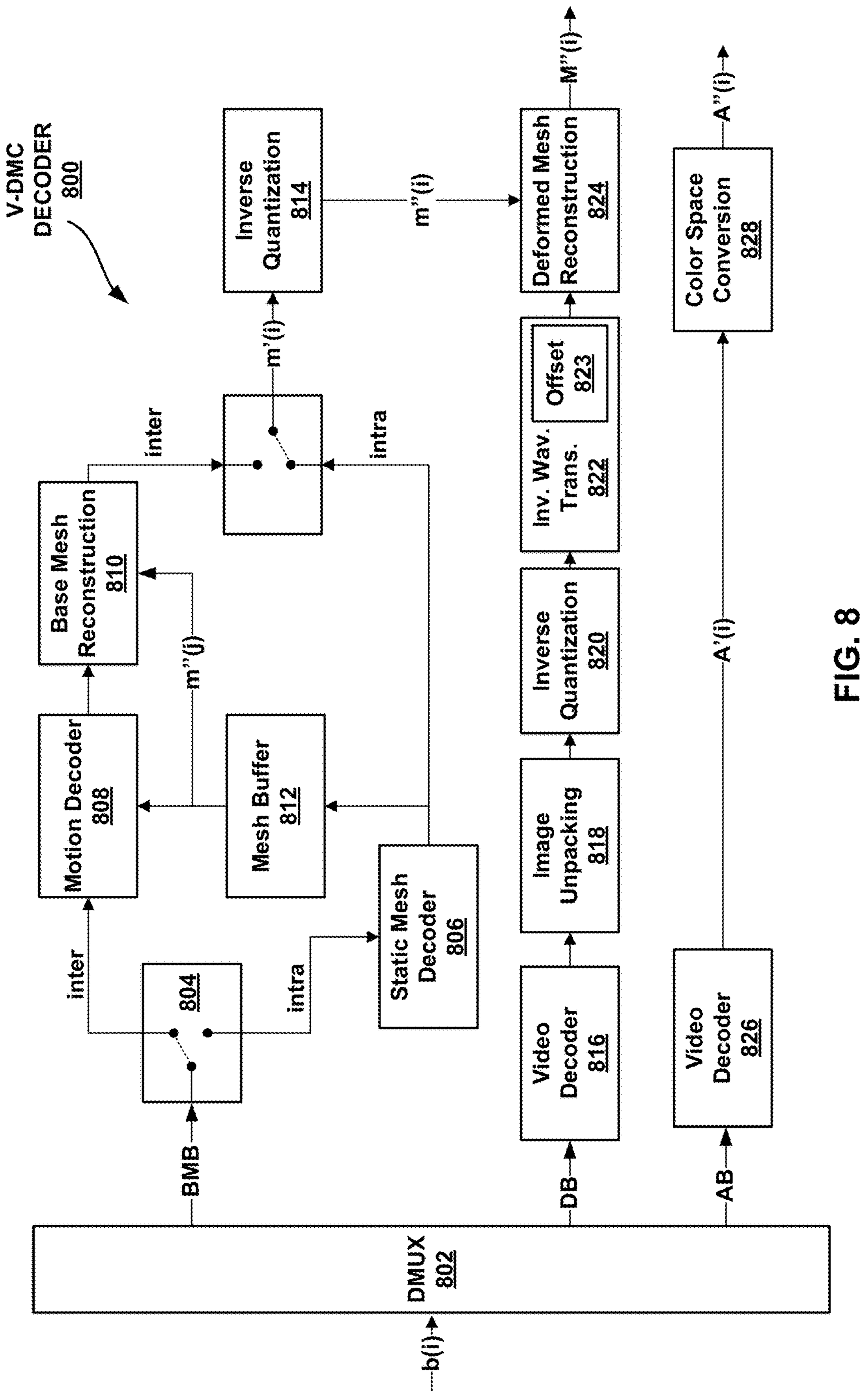
FIG. 8 shows an example of a V-DMC decoder.

FIG. 8 shows V-DMC decoder 800, which may be configured to perform either intra- or inter-decoding. V-DMC decoder 800 represents an example implementation of V-DMC decoder 300. The processes described with respect to FIG. 8 may also be performed, in full or in part, by V-DMC encoder 200.

V-DMC decoder 800 includes demultiplexer (DMUX) 802, which receives compressed bitstream b(i) and separates the compressed bitstream into a base mesh bitstream (BMB), a displacement bitstream (DB), and an attribute bitstream (AB). Mode select unit 804 determines if the base mesh data is encoded in an intra mode or an inter mode. If the base mesh is encoded in an intra mode, then static mesh decoder 806 decodes the mesh data without reliance on any previously decoded meshes. If the base mesh is encoded in an inter mode, then motion decoder 808 decodes motion, and base mesh reconstruction unit 810 applies the motion to an already decoded mesh (m"(j)) stored in mesh buffer 812 to determine a reconstructed quantized base mesh (m'(i))). Inverse quantization unit 814 applies an inverse quantization to the reconstructed quantized base mesh to determine a reconstructed base mesh (m"(i)).

Video decoder 816 decodes the displacement bitstream to determine a set or frame of quantized transform coefficients. Image unpacking unit 818 unpacks the quantized transform coefficients. For example, video decoder 816 may decode the quantized transform coefficients into a frame, where the quantized transform coefficients are organized into blocks with particular scanning orders. Image unpacking unit 818 converts the quantized transform coefficients from being organized in the frame into an ordered series. In some implementations, the quantized transform coefficients may be directly coded, using a context-based arithmetic coder for example, and unpacking may be unnecessary.

Regardless of whether the quantized transform coefficients are decoded directly or in a frame, inverse quantization unit 820 inverse quantizes, e.g., inverse scales, quantized transform coefficients to determine de-quantized transform coefficients. Inverse wavelet transform unit 822 applies an inverse transform to the de-quantized transform coefficients to determine a set of displacement vectors. Inverse wavelet transform unit 822 includes offset unit 823. Offset unit 823 is configured to determine an offset value based on one or more syntax elements and apply the offset to a set of transform coefficients to determine a set of updated transform coefficients before inverse wavelet transform unit 822 applies the inverse transform.

Deformed mesh reconstruction unit 824 deforms the reconstructed base mesh using the decoded displacement vectors to determine a decoded mesh (M"(i)). Video decoder 826 decodes the attribute bitstream to determine decoded attribute values (A'(i)), and color space conversion unit 828 converts the decoded attribute values into a desired color space to determine final attribute values (A"(i)). The final attribute values correspond to attributes, such as color or texture, for the vertices of the decoded mesh.

Figure 9:
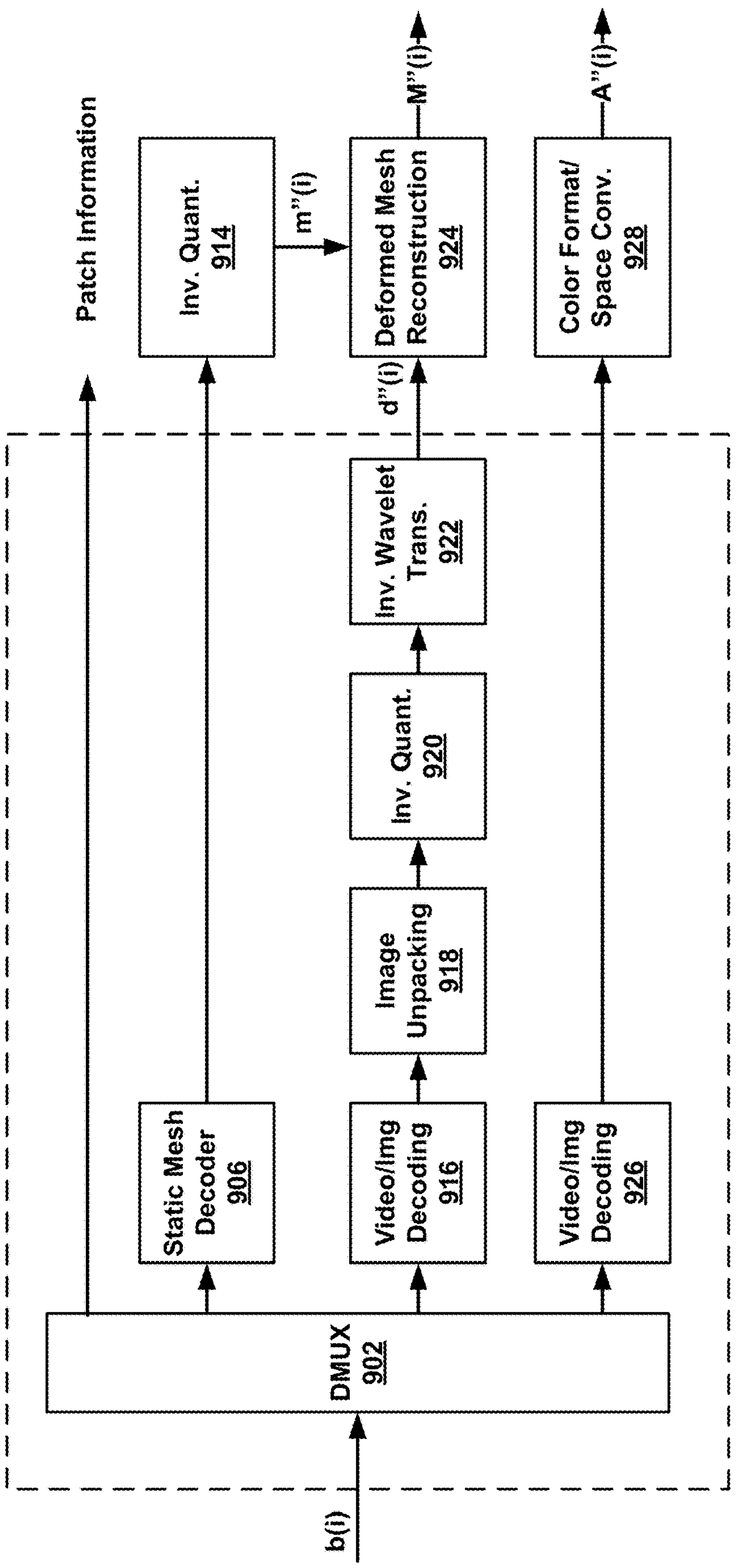
FIG. 9 shows an example of a V-DMC intra frame decoder.

FIG. 9 shows a block diagram of an intra decoder which may, for example, be part of V-DMC decoder 300. De-multiplexer (DMUX) 902 separates compressed bitstream (bi) into a mesh sub-stream, a displacement sub-stream for positions and potentially for each vertex attribute, zero or more attribute map sub-streams, and an atlas sub-stream containing patch information in the same manner as in V3C/V-PCC.

De-multiplexer 902 feeds the mesh sub-stream to static mesh decoder 906 to generate the reconstructed quantized base mesh m'(i). Inverse quantization unit 914 inverse quantizes the base mesh to determine the decoded base mesh m"(i). Video/image decoding unit 916 decodes the displacement sub-stream, and image unpacking unit 918 unpacks the image/video to determine quantized transform coefficients, e.g., wavelet coefficients. Inverse quantization unit 920 inverse quantizes the quantized transform coefficients to determine dequantized transform coefficients. Inverse transform unit 922 generates the decoded displacement field d"(i) by applying the inverse transform to the unquantized coefficients. Deformed mesh reconstruction unit 924 generates the final decoded mesh (M"(i)) by applying the reconstruction process to the decoded base mesh m"(i) and by adding the decoded displacement field d"(i). The attribute sub-stream is directly decoded by video/image decoding unit 928 to generate an attribute map A"(i). Color format/space conversion unit may convert the attribute map into a different format or color space.

Figure 10:
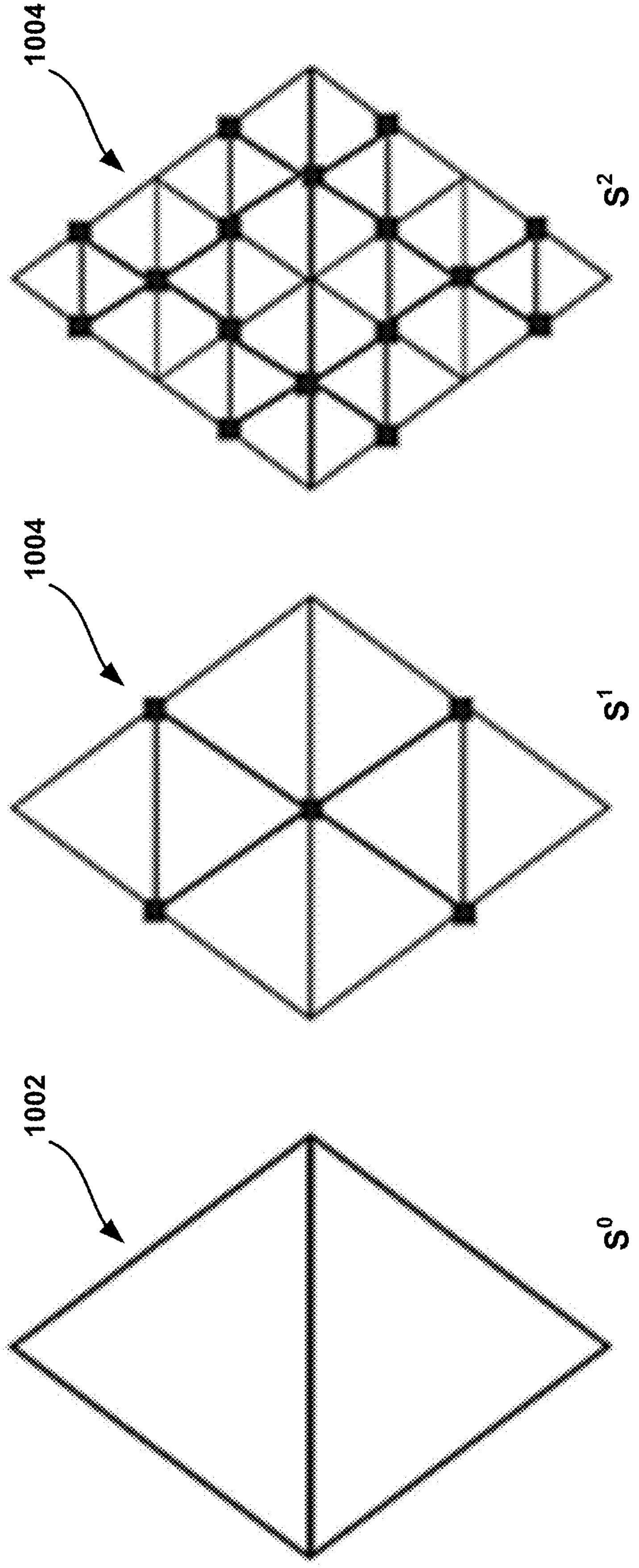
FIG. 10 shows an example of a mid-point subdivision scheme.

V-DMC encoder 200 and V-DMC decoder 300 may be configured to implement a subdivision scheme. Various subdivision schemes could be considered. A possible solution is the mid-point subdivision scheme, which at each subdivision iteration subdivides each triangle into four sub-triangles as described in FIG. 10. New vertices are introduced in the middle of each edge. In the example, FIG. 10, triangles 1002 are subdivided to obtain triangles 1004, and triangles 1004 are subdivided to obtain triangles 1006. The subdivision process is applied independently to the geometry and to the texture coordinates since the connectivity for the geometry and for the texture coordinates is usually different. The sub-division scheme computes the position $Pos(v_{12})$ of a newly introduced vertex $v_{12}$ at the center of an edge $(v_1, v_2)$, as follows:

$$Pos(v_{12}) = \frac{1}{2}(Pos(v_1) + Pos(v_2)),$$

where $Pos(v_1)$ and $Pos(v_2)$ are the positions of the vertices $v_1$ and $v_2$.

The same process is used to compute the texture coordinates of the newly created vertex. For normal vectors, an extra normalization step is applied as follows:

$$N(v_{12}) = \frac{N(v_1) + N(v_2)}{\|N(v_1) + N(v_2)\|},$$

here:

$N(v_{12})$, $N(v_1)$, and $N(v_2)$ are the normal vectors associated with the vertices $v_{12}$, $v_1$, and $v_2$, respectively.

$\|x\|$ is the norm2 of the vector x.

V-DMC encoder 200 and V-DMC decoder 300 may be configured to apply wavelet transforms. Various wavelet transforms may be applied. The results reported for CP are based on a linear wavelet transform.

The prediction process is defined as follows:

$$\text{Signal}(v) \leftarrow \text{Signal}(v) - \frac{1}{2}(\text{Signal}(v_1) + \text{Signal}(v_2))$$

where v is the vertex introduced in the middle of the edge ($v_1$, $v_2$), and

Signal(v), Signal($v_1$), and Signal($v_2$) are the values of the geometry/vertex attribute signals at the vertices v, $v_1$, and $v_2$, respectively.

The updated process is as follows:

$$\text{Signal}(v) \leftarrow \text{Signal}(v) + \frac{1}{8}\sum_{w \in v^*} \text{Signal}(w)$$

where v* is the set of neighboring vertices of the vertex v.

The scheme may allow to skip the update process. The wavelet coefficients could be quantized e.g., by using a uniform quantizer with a dead zone.

Local versus canonical coordinate systems for displacements will now be discussed. The displacement field d(i) is defined in the same cartesian coordinate system as the input mesh. A possible optimization is to transform d(i) from this canonical coordinate system to a local coordinate system, which is defined by the normal to the subdivided mesh at each vertex.

A potential advantage of considering a local coordinate system for the displacements is the possibility to quantize more heavily the tangential components of the displacements compared to the normal component. In fact, the normal component of the displacement has more significant impact on the reconstructed mesh quality than the two tangential components.

V-DMC encoder 200 and V-DMC decoder 300 may be configured to implement packing of wavelet coefficients. The following scheme is used to pack the wavelet coefficients into a 2D image:

Traverse the coefficients from low to high frequency.

For each coefficient, determine the index of the N×M pixel block (e.g., N=M=16) in which it should be stored following a raster order for blocks.

The position within the N×M pixel block is computed by using a Morton order to maximize locality.

Other packing schemes could be used (e.g., zigzag order, raster order). The encoder could explicitly signal in the bitstream the used packing scheme (e.g., atlas sequence parameters). This could be done at patch, patch group, tile, or sequence level.

V-DMC encoder 200 may be configured to displacement video encoding. The proposed scheme is agnostic of which video coding technology is used. When coding the displacement wavelet coefficients, a lossless approach may be used since the quantization is applied in a separate module. Another approach is to rely on the video encoder to compress the coefficients in a lossy manner and apply a quantization either in the original or transform domain.

V-DMC encoder 200 and V-DMC decoder 300 may be configured to process a lifting transform parameter set and associated semantics, an example of which is shown in TABLE 1 below.

TABLE 1

| | |
|---|---|
| vmc_lifting_transform_parameters( index, ltpIndex ){ | |
| vmc_transform_lifting_skip_update_flag[index][ ltpIndex ] | u(1) |
| vmc_transform_lifting_quantization_parameters_x[index][ ltpIndex ] | u(6) |
| vmc_transform_lifting_quantization_parameters_y[index][ ltpIndex ] | u(6) |
| vmc_transform_lifting_quantization_parameters_z[index][ ltpIndex ] | u(6) |
| vmc_transform_log2_lifting_lod_inverse_scale_x[index][ ltpIndex ] | ue(v) |
| vmc_transform_log2_lifting_lod_inverse_scale_y[index][ ltpIndex ] | ue(v) |
| vmc_transform_log2_lifting_lod_inverse_scale_z[index][ ltpIndex ] | ue(v) |
| vmc_transform_log2_lifting_update_weight[index][ ltpIndex ] | ue(v) |
| vmc_transform_log2_lifting_prediction_weight[index][ ltpIndex ] | ue(v) |
| } | |

syntax_element[i][ltpIndex] with i equal to 0 may be applied to the displacement. syntax_element[i][ltpIndex] with i equal to non-zero may be applied to the (i-1)-th attribute, where ltpIndex is the index of the lifting transform parameter set list.

vmc_transform_lifting_skip_update_flag[i][ltpIndex] equal to 1 indicates the step of the lifting transform applied to the displacement is skipped in the vmc_lifting_transform_parameters(index, lptIndex) syntax structure, where ltpIndex is the index of the lifting transform parameter set list. vmc_transform_lifting_skip_update_flag[i][ltpIndex] with i equal to 0 may be applied to the displacement. vmc_transform_lifting_skip_update_flag[i][ltpIndex] with i equal to non-zero may be applied to the (i-1)-th attribute.

vmc_transform_lifting_quantization_parameters_x[i][ltpIndex] indicates the quantization parameter to be used for the inverse quantization of the x-component of the displacements wavelets coefficients. The value of vmc_transform_lifting_quantization_parameters_x[index][ltpIndex] shall be in the range of 0 to 51, inclusive.

vmc_transform_lifting_quantization_parameters_y[i][ltpIndex] indicates the quantization parameter to be used for the inverse quantization of the y-component of the displacements wavelets coefficients. The value of vmc_transform_lifting_quantization_parameters_x[index][ltpIndex] shall be in the range of 0 to 51, inclusive.

vmc_transform_lifting_quantization_parameters_z[i][ltpIndex] indicates the quantization parameter to be used for the inverse quantization of the z-component of the displacements wavelets coefficients. The value of vmc_transform_lifting_quantization_parameters_x[index][ltpIndex] shall be in the range of 0 to 51, inclusive.

vmc_transform_log 2_lifting_lod_inverse_scale_x[i][ltpIndex] indicates the scaling factor applied to the x-component of the displacements wavelets coefficients for each level of detail.

vmc_transform_log 2_lifting_lod_inverse_scale_y[i][ltpIndex] indicates the scaling factor applied to the y-component of the displacements wavelets coefficients for each level of detail.

vmc_transform_log 2_lifting_lod_inverse_scale_z[i][ltpIndex] indicates the scaling factor applied to the z-component of the displacements wavelets coefficients for each level of detail.

vmc_transform_log 2_lifting_update_weight[i][ltpIndex] indicates the weighting coefficients used for the update filter of the wavelet transform.

vmc_transform_log 2_lifting_prediction_weight[i][ltpIndex] the weighting coefficients used for the prediction filter of the wavelet transform.

V-DMC decoder 300 may be configured to perform inverse image packing of wavelet coefficients. Inputs to this process are:

- width, which is a variable indicating the width of the displacements video frame,
- height, which is a variable indicating the height of the displacements video frame,
- bitDepth, which is a variable indicating the bit depth of the displacements video frame,
- dispQuantCoeffFrame, which is a 3D array of size width×height×3 indicating the packed quantized displacement wavelet coefficients.
- blockSize, which is a variable indicating the size of the displacements coefficients blocks,
- positionCount, which is a variable indicating the number of positions in the subdivided submesh.

The output of this process is dispQuantCoeffArray, which is a 2D array of size positionCount×3 indicating the quantized displacement wavelet coefficients.

Let the function extracOddBits(x) be defined as follows:

```
x = extracOddBits( x ) {
    x = x & 0x55555555
    x = (x | (x >> 1)) & 0x33333333
    x = (x | (x >> 2)) & 0x0F0F0F0F
    x = (x | (x >> 4)) & 0x00FF00FF
    x = (x | (x >> 8)) & 0x0000FFFF
}
```

Let the function computeMorton2D(i) be defined as follows:

```
(x, y) = computeMorton2D( i ) {
    x = extracOddBits( i >> 1 )
    y = extracOddBits( i )
}
```

The wavelet coefficients inverse packing process proceeds as follows:

```
pixelsPerBlock = blockSize * blockSize
widthInBlocks = width / blockSize
shift = (1 << bitDepth) >> 1
for( v = 0; v < positionCount; v++ ) {
  blockIndex = v / pixelsPerBlock
  indexWithinBlock = v % pixelsPerBlock
  x0 = (blockIndex % widthInBlocks) * blockSize
  y0 = (blockIndex / widthInBlocks) * blockSize
  ( x, y ) = computeMorton2D(indexWithinBlock)
  x = x0 + x
```

-continued

```
  y = y0 + y
  for( d = 0; d < 3; d++ ) {
    dispQuantCoeffArray[ v ][ d ] = dispQuantCoeffFrame[ x ][ y ][ d ]
    - shift
  }
}
```

V-DMC decoder 300 may be configured to perform inverse quantization of wavelet coefficients. Inputs to this process are:

- positionCount, which is a variable indicating the number of positions in the subdivided submesh.
- dispQuantCoeffArray, which is a 2D array of size positionCount×3 indicating the quantized displacement wavelet coefficients.
- subdivisionIterationCount, which is a variable indicating the number of subdivision iterations.
- liftingQP, which is a 1D array of size 3 indicating the quantization parameter associated with the three displacement dimensions.
- liftingLevelOfDetailInverseScale, which is a 1D array of size 3 indicating the inverse scale factor associated with the three displacement dimensions.
- levelOfDetailAttributeCounts, a 1D array of size (subdivisionIterationCount+1) indicating the number of attributes associated with each subdivision iteration.
- bitDepthPosition, which is a variable indicating the bit depth of the mesh positions.

The output of this process is dispCoeffArray, which is a 2D array of size positionCount×3 indicating the dequantized displacement wavelet coefficients.

The wavelet coefficients inverse quantization process proceeds as follows:

```
for ( d =0; d < 3; ++d) {
  qp = liftingQP[ d ]
  iscale[ d ] = qp >= 0 ? pow( 0.5, 16 - bitDepthPosition + ( 4 - qp ) /
  6) : 0.0
  ilodScale[ d ] = liftingLevelOfDetailInverseScale[ d ]
}
vcount0 = 0
for( i = 0; i < subdivisionIterationCount; i++ ) {
  vcount1 = levelOfDetailAttributeCounts[ i ]
  for( v = vcount0; v < vcount1; v++ ) {
    for( d = 0; d < 3; d++ ) {
      dispCoeffArray[ v ][ d ] = dispQuantCoeffArray[ v ][ d ] *
      iscale[ k ]
    }
  }
  vcount0 = vcount1
  for( d = 0; d < 3; d++ ) {
    iscale[d] *= ilodScale[ d ]
  }
}
```

V-DMC decoder 300 may be configured to apply an inverse linear wavelet transform. Inputs to this process are:

- positionCount, which is a variable indicating the number of positions in the subdivided submesh.
- dispCoeffArray, which is a 2D array of size positionCount×3 indicating the displacement wavelet coefficients.
- levelOfDetailAttributeCounts, a 1D array of size (subdivisionIterationCount+1) indicating the number of attributes associated with each subdivision iteration.
- edges, which is a 2D array of size positionCount×2 which indicates for each vertex v produced by the subdivision process described above, the two indices (a, b) of the two vertices used to generated it (i.e., v generated as the middle of the edge (a, b)).

updateWeight, which is a variable indicating the lifting update weight.

predWeight, which is a variable indicating the lifting prediction weight.

skipUpdate, which is a variable indicating whether the update operation should be skipped (when 1) or not (when 0).

The output of this process is dispArray, which is a 2D array of size positionCount×3 indicating the displacements to be applied to the mesh positions.

The inverse wavelet transform process proceeds as follows:

```
for( i = 0; i < subdivisionIterationCount; i++ ) {
   vcount0 = levelOfDetailAttributeCounts[i]
   vcount1 = levelOfDetailAttributeCounts[i + 1]
   for ( v = vcount0; skipUpdate == 0 && v < vcount1; ++v ) {
      a = edges[v][0]
      b = edges[v][1]
      for( d = 0; d < 3; d++ ) {
         disp = updateWeight * dispCoeffArray[v][d]
         signal[a][d] -= disp
         signal[b][d] -= disp
      }
   }
   for ( v = vcount0; skipUpdate == 0 && v < vcount1; ++v ) {
      a = edges[v][0]
      b = edges[v][1]
      for( d = 0; d < 3; d++ ) {
         dispCoeffArray[v][d] +=
            predWeight * (dispCoeffArray[a][d] +
dispCoeffArray[b][d])
      }
   }
}
for ( v = 0; v < positionCount; ++v ) {
   for( d = 0; d < 3; d++ ) {
      dispArray[v][d] = dispCoeffArray[v][d]
   }
}
```

V-DMC decoder 300 may be configured to perform positions displacement. The inputs of this process are:

positionCount, which is a variable indicating the number of positions in the subdivided submesh.

positionsSubdiv, which is a 2D array of size positionCount×3 indicating the positions of the subdivided submesh.

dispArray, which is a 2D array of size positionCount×3 indicating the displacements to be applied to the mesh positions.

normals, which is a 2D array of size positionCount×3 indicating the normals to be used when applying the displacements to the submesh positions.

tangents, which is a 2D array of size positionCount×3 indicating the tangents to be used when applying the displacements to the submesh positions.

bitangents, which is a 2D array of size positionCount×3 indicating the tangents to be used when applying the displacements to the submesh positions.

The output of this process is positionsDisplaced, which is a 2D array of size positionCount×3 indicating the positions of the displaced subdivided submesh.

The positions displacement process proceeds as follows:

```
for ( v = 0; v < positionCount; ++v ) {
   for( d = 0; d < 3; d++ ) {
      positionsDisplaced[ v ][ d ] = positionsSubdiv[ v ][ d ] +
         dispArray[ v ][ 0 ] * normals[ v ][ d ] +
         dispArray[ v ][ 1 ] * tangents[ v ][ d ] +
         dispArray[ v ][ 2 ] * bitangents[ v ][ d ]
   }
}
```

As described above with respect to wavelet transforms, the displacement vectors are transformed using a lifting transform that has a prediction step followed by an update process. The current implementation of lifting transforms has some shortcomings. As an example, the prediction and update weights are 0.5 and 0.125 respectively, which are not optimal. This disclosure introduces a tuned offset to make the prediction and update process efficient. As another example, although there is an option to skip updates for all the level of details, there is no functionality to turn off the update step after a certain level. This functionality could be useful in the case of adaptive update weights based on the level of detail, i.e., when the update weight iteratively becomes miniscule to have any effect on the updates. The number of updates performed can be signaled using the one of the following syntaxes:

"vdmc_transform_lifting_skip_update_level[index][ltpIndex]" when

"vdmc_transform_lifting_skip_update_flag[index][ltpIndex]" is set to 1 or

"vdmc_transform_lifting_update_levels[index][ltpIndex]"

As another example, for adaptive update weight based on LOD as originally proposed in, Chao Cao, [V-DMC][NEW] "LOD-based adaptive update weight for Forward Linear Lifting Wavelet Transform," ISO/IEC JTC 1/SC 29/WG 7 MPEG input document m64223, Geneva, CH, July 2023 (hereinafter m64223), the associated values are signaled using the following syntax:

vdmc_transform_lifting_adaptive_update_weight_flag [index][ltpIndex]

vdmc_transform_lifting_adaptive_update_weight_scale [index][ltpIndex]

vdmc_transform_log 2_lifting_adaptive_update_weight [index][ltpIndex]

In the case of adaptive weight, a total of three syntax elements may be used, out of which two are related to the update weight using a formula instead of using only one for the update weight, which creates inefficient signaling. This disclosure introduces solutions to these problems. More specifically, this disclosure describes examples for performing a signal lifting update of weights per LOD in an adaptive scheme.

Figure 11:
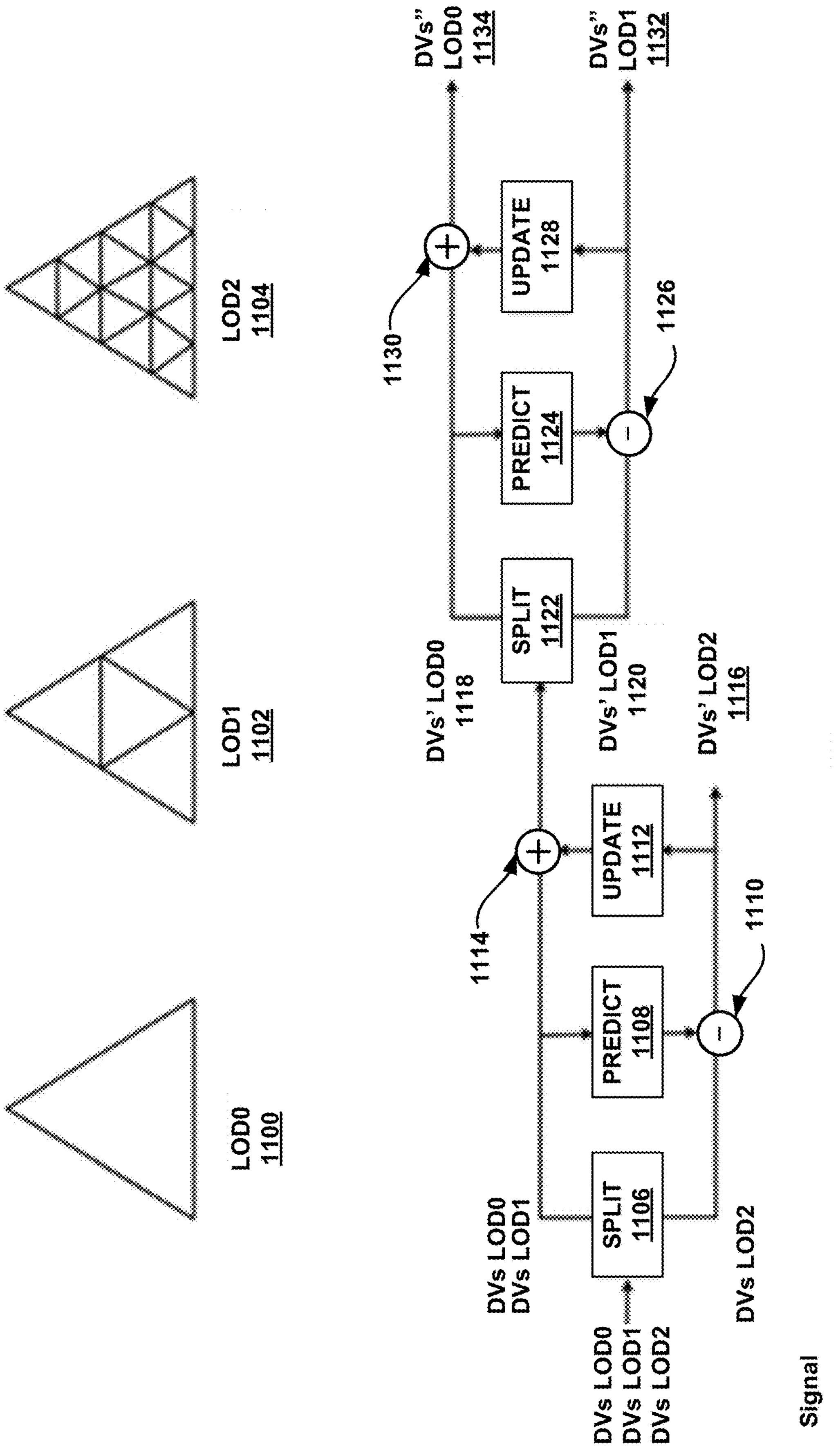
FIG. 11 shows an example implementation of a forward lifting transform.

FIG. 11 shows an example implementation of a forward lifting transform. V-DMC encoder 200 may be configured to implement a lifting transform with an offset as described herein, and V-DMC decoder 300 may be configured to implement an inverse transform, which is essentially an inverse of the process of shown in FIG. 11. The encoding process of the displacement bitstream is illustrated in FIG. 11, where displacement vectors are wavelet transformed using the lifting scheme.

LOD0 1100 represents a base mesh. LOD1 1102 represents a subdivided base mesh after a first subdivision, and LOD2 represents the subdivided base mesh after a second subdivision. V-DMC encoder 200 may compare the subdivided mesh, e.g., at LOD 1102, to the original mesh to determine displacement vectors for the vertices of the subdivided mesh.

At split 1106, V-DMC encoder 200 splits the input signal into two different signals, one corresponding to the displacement vectors for LOD0 1100 and the displacement vectors for LOD1 1102 and the other corresponding to the displacement vectors for LOD2 1104. At prediction 1108, V-DMC encoder 200 predicts the finest level values (i.e., displacement vectors for LOD2 1104) based on the lower-level values (i.e., displacement vectors for LOD0 1100 and LOD1 1102). At subtracter 1110, V-DMC encoder 200 determines the difference between the original displacement vectors for LOD2 1104 and the predicted displacement vectors for LOD2 1104, i.e., the output of predict 1108. This difference is referred to as transformed displacement vectors for LOD2 (DVs' LOD2 1116). DVs' LOD2 1116 typically has less energy than the original displacement vector values for LOD2 1104, meaning that the values of DVs' LOD2 1116 are generally closer to 0. Due to the values of DVs' LOD2 1116 having less energy, the values can be encoded with fewer bits and with less loss due to quantization. At 1112, V-DMC encoder 200 determines an update and adds, at summer 1114, the update to the displacement vectors for LOD0 1100 and LOD1 1102 to determine updated DVs' LOD0 1118 and DVs' LOD1120.

A similar process is then performed for the updated displacement vectors DVs' LOD0 1118 and DVs' LOD11120. At split 1122, V-DMC encoder 200 splits the input signal into two different signals, one corresponding to updated DVs' LOD0 1118 and the other corresponding to DVs' LOD1120. At 1124, V-DMC encoder 200 predicts the higher-level values (i.e., DVs' LOD11120) based on the lower-level values (i.e., DVs' LOD0 1118).

At subtracter 1126, V-DMC encoder 200 determines the difference between the original values of DVs' LOD1120 and the predicted values DVs' LOD1120. This difference is referred to as transformed displacement vectors for LOD1 (DVs" LOD1 1132). As explained above with respect to DVs' LOD2 1116, DVs" LOD1 1132 typically has less energy than DVs' LOD1 1110, meaning that the values of DVs" LOD1 1132 are generally closer to 0. Due to the values of DVs" LOD1 1132 having less energy, the values can be encoded with fewer bits and with less loss due to quantization. At 1128, V-DMC encoder 200 determines an update and adds, at summer 1130, the update to DVs' LOD0 1118 to determine updated DVs" LOD0 1134. As will be explained in more detail below, the updates performed at 1112 and 1128 also further improve compression.

According to the techniques of this disclosure, a forward lifting transform is impacted making it an encoder only change. The forward transform starts from the finest level (shown as LOD2) as depicted in FIG. 11. Lifting transform is an iterative process where the input signal is divided into two signals. Then the vertices (v1 and v2) from lower LOD (LOD 0 and LOD1) on the same edge are used to predict the higher LOD (LOD2 in this example) samples (forward transform).

In the current implementation, the prediction is an average of the two vertices on the same edge, i.e., predWeight=0.5. An error signal is computed by subtracting the predictions with the original signal. Finally, an update is made to recalibrate the lower LOD samples. In TMMv4.0, updateWeight is 0.125.

The implementation of the forward lifting transform in V-DMC reference software is as follows:

```
template<class T1, class T2>
void
computeForwardLinearLifting(
  std::vector<T1>&                                   signal,
  const std::vector<vmesh::SubdivisionLevelInfo>& infoLevelOfDetails,
  const std::vector<int64_t>&                        edges,
  const T2                                          predWeight,
  const T2                                          updateWeight,
  const bool                                        skipUpdate) {
  const auto lodCount = int32_t(infoLevelOfDetails.size( ));
  assert(lodCount > 0);
  const auto rfmtCount = lodCount − 1;
  for (int32_t it = rfmtCount − 1; it >= 0; −−it) {
    const auto vcount0 = infoLevelOfDetails[it].pointCount;
    const auto vcount1 = infoLevelOfDetails[it + 1].pointCount;
    assert(vcount0 < vcount1 && vcount1 <= int32_t(signal.size( )));
    // predict
    for (int32_t v = vcount0; v < vcount1; ++v) {
      const auto edge = edges[v];
      const auto v1   = int32_t(edge & 0xFFFFFFFF);
      const auto v2   = int32_t((edge >> 32) & 0xFFFFFFFF);
      assert(v1 >= 0 && v1 <= vcount0);
      assert(v2 >= 0 && v2 <= vcount0);
      signal[v] −= predWeight * (signal[v1] + signal[v2]);
    }
    // update
    for (int32_t v = vcount0; !skipUpdate && v < vcount1; ++v) {
      const auto edge = edges[v];
      const auto v1 = int32_t(edge & 0xFFFFFFFF);
      const auto v2 = int32_t((edge >> 32) & 0xFFFFFFFF);
      assert(v1 >= 0 && v1 <= vcount0);
      assert(v2 >= 0 && v2 <= vcount0);
      const auto d = updateWeight * signal[v];
      signal[v1] += d;
      signal[v2] += d;
    }
  }
}
```

The tuned offset in both the prediction and update steps for the forward lifting transform is introduced as follows, with the offset step being bolded:

```
template<class T1, class T2>
void
computeForwardLinearLifting(
  std::vector<T1>&                                   signal,
  const std::vector<vmesh::SubdivisionLevelInfo>&
  infoLevelOfDetails,
  const std::vector<int64_t>&                        edges,
  const T2                                          predWeight,
  const T2                                          updateWeight,
  const bool                                        skipUpdate) {
  const auto lodCount = int32_t(infoLevelOfDetails.size( ));
  assert(lodCount > 0);
  const auto rfmtCount = lodCount − 1;
  for (int32_t it = rfmtCount − 1; it >= 0; −−it) {
    const auto vcount0 = infoLevelOfDetails[it].pointCount;
    const auto vcount1 = infoLevelOfDetails[it + 1].pointCount;
    assert(vcount0 < vcount1 && vcount1 <= int32_t(signal.size( )));
    // predict
    for (int32_t v = vcount0; v < vcount1; ++v) {
      const auto edge = edges[v];
      const auto v1 = int32_t(edge & 0xFFFFFFFF);
      const auto v2 = int32_t((edge >> 32) & 0xFFFFFFFF);
      assert(v1 >= 0 && v1 <= vcount0);
      assert(v2 >= 0 && v2 <= vcount0);
      for (int32_t i = 0; i < 3; ++i) {
        double val = signal[v1][i] + signal[v2][i];
        signal[v][i] −= (val < 0 ? −((−val + predWeightOffset) *
predWeight) : ((val + predWeightOffset) * predWeight));
      }
    }
    // update
```

-continued

```
    for (int32_t v = vcount0; !skipUpdate && v < vcount1; ++v) {
      const auto edge = edges[v];
      const auto v1    = int32_t(edge & 0xFFFFFFFF);
      const auto v2    = int32_t((edge >> 32) & 0xFFFFFFFF);
      assert(v1 >= 0 && v1 <= vcount0);
      assert(v2 >= 0 && v2 <= vcount0);
      std::vector<double> d(3);
      for (int32_t i = 0; i < 3; ++i) {
        double val = signal[v][i];
        d[i]    = (val < 0 ? −((−val + updateWeightOffset) *
updateWeight) : ((val + updateWeightOffset) * updateWeight));
        signal[v1][i] += d[i];
        signal[v2][i] += d[i];
      }
    }
  }
}
```

Here, the displacement vector transformed values are rounded away from 0 which in some simulations, has provided a point cloud-based BD-rate and an image-based BD-rate gain of up to 1.9% and 4.4% respectively.

In one example, the predWeightOffset and updateWeightOffset are set equal to value 0.0625. The tuned offset could also be subtracted in the inverse lifting transform that is part of the decoding process as shown in the implementation below:

```
template<class T1, class T2>
void
computeInverseLinearLifting(
  std::vector<T1>&                         signal,
  const std::vector<vmesh::SubdivisionLevelInfo>&
  infoLevelOfDetails,
  const std::vector<int64_t>&                  edges,
  const T2                           predWeight,
  const T2                           updateWeight,
  const bool                         skipUpdate) {
  printf("Compute inverse linear lifting \n");
  fflush(stdout);
  const auto lodCount = int32_t(infoLevelOfDetails.size( ));
  assert(lodCount > 0);
  const auto rfmtCount = lodCount − 1;
  for (int32_t it = 0; it < rfmtCount; ++it) {
    const auto vcount0 = infoLevelOfDetails[it].pointCount;
    const auto vcount1 = infoLevelOfDetails[it + 1].pointCount;
    assert(vcount0 < vcount1 && vcount1 < = int32_t(signal.size( )));
    // update
    int32_t updateWeightOffset = (1 << updateWeight) >> 1;
    for (int32_t v = vcount0; !skipUpdate && v < vcount1; ++v) {
      const auto edge = edges[v];
      const auto v1    = int32_t(edge & 0xFFFFFFFF);
      const auto v2    = int32_t((edge >> 32) & 0xFFFFFFFF);
      assert(v1 >= 0 && v1 <= vcount0);
      assert(v2 >= 0 && v2 <= vcount0);
      std::vector<double> d(3);
      for(int32_t i = 0; i < 3; ++i) {
        int32_t val = signal[v][i];
        d[i] = (val < 0 ? −((−val − updateWeightOffset) *
updateWeight) : ((val − updateWeightOffset) * updateWeight));
        signal[v1][i] −= d[i];
        signal[v2][i] −= d[i];
      }
    }
  // predict
  int32_t predWeightOffset = (1 << predWeight) >> 1;
  for (int32_t v = vcount0; v < vcount1; ++v) {
      const auto edge = edges[v];
      const auto v1    = int32_t(edge & 0xFFFFFFFF);
      const auto v2    = int32_t((edge >> 32) & 0xFFFFFFFF);
      assert(v1 >= 0 && v1 <= vcount0);
      assert(v2 >= 0 && v2 <= vcount0);
      for(int32_t i = 0; i < 3; ++i) {
        int32_t val = signal[v1][i] + signal[v2][i];
        signal[v][i] += (val < 0 ? −((−val − predWeightOffset) *
predWeight) : ((val − predWeightOffset) * predWeight));
        }
      }
    }
  }
```

In one example, the offsets are added (instead of subtraction) in the inverse lifting scheme (in the bolded lines above). The results for using an offset in both encoder and decoder has been found to improve the image-based BD-rate compared to an encoder-only change.

In general, the update and prediction offsets can be used together or separately in either or both encoder and decoder. The values of update and prediction offsets can be constant or signaled in the bitstream to the decoder, for example, in a lifting parameter set, in the sequence parameter set, or equivalent. The update and prediction offset values may also be mathematically determined.

In the current implementation of V-DMC TMM V6.0, there is a bias present when the distribution of prediction residual of the x-component of the displacement vector is plotted. The error signal is computed by subtracting the predictions with the original signal. Finally, an update is made to recalibrate the lower LOD samples.

The bias in the prediction error signal is addressed by incorporating an offset after the prediction step as follows:

$$\text{signal}\,[v] = \text{signal}\,[v] < 0\,?\ \text{signal}\,[v] + N_{offset}:\ \text{signal}\,[v] - P_{offset}$$

Where, $N_{offset} = \text{mean}\,(\text{residuals} < 0)$ and $P_{offset} = \text{mean}\,(\text{residuals} > 0)$.

Note that the mean or average of residuals is computed to determine the offsets, however, this is one example and various other methods could be used.

The implementation of this solution is as follows, with the implementation of the offsets shown between the delimiters <add> and </add>:

```
Encoder:
  signal[v] −= predWeight * (signal[v1] + signal[v2]);
    <add> if(offsets[0]!=0 && offsets[1]!=0){
      signal[v][0] = (signal[v][0] < 0 ? (signal[v][0] + 1/offsets[0]) :
(signal[v][0] − 1/offsets[1]));
    }</add>
Decoder:
  <add> if(offsets[0]!=0 && offsets[1]!=0){
      signal[v][0] = (signal[v][0] < 0 ? (signal[v][0] − 1/offsets[0]) :
(signal[v][0] + 1/offsets[1]));
    }</add>
      signal[v] += predWeight * (signal[v1] + signal[v2]);
```

One approximated offset instead of two values for the offset may also be used. Using one approximated offset has been shown to produce image-based BD-rate geometry gain. A reduction in the displacement bitstream has been observed as a result of bias adjustment in the error signal.

The proposed syntax for this implementation is as follows, with the implementation of the offsets shown between the delimiters <add> and </add>:

```
vdmc_lifting_transform_parameters( ltpIndex, subdivisionCount
){
vltp_adaptive_quantization_enabled_flag[ ltpIndex ]            u(1)
```

-continued

```
vltp_lod_quantization_flag[ ltpIndex ]                                  u(1)
vltp_bitdepth_offset[ ltpIndex ]                                        se(v)
if( vltp_lod_quantization_flag[ ltpIndex ] == 0 ) {
  for( k = 0; k < DisplacementDim; k++) {
      if( vltp_adaptive_quantization_enabled_flag[ ltpIndex ] )
      {
        vltp_scale_factors[ ltpIndex ][ k ]                             ue(v)
      } else {
        vltp_quantization_parameters[ ltpIndex ][ k ]                   ue(v)
        vltp_log2_lifting_lod_inverse_scale[ ltpIndex ][ k ]            u(2)
      }
  }
} else {
  for( i=0 ; i < subdivisionCount + 1; i++ ) {
      for( k = 0; k < DisplacementDim; k++ ) {
  if( vltp_adaptive_quantization_enabled_flag[ ltpIndex ] ) {
          vltp_lod_delta_scale[ ltpIndex ][ i ][ k ]                    u(6)
          if( vltp_lod_delta_scale[ ltpIndex ][ i ][ k ] )
            vltp_lod_delta_scale_sign[ ltpIndex ][ i ][ k ]             u(1)
        } else {
          vltp_lod_delta_qp [ ltpIndex ][ i ][ k ]                      u(6)
          if ( vltp_lod_delta_qp[ ltpIndex ][ i ][ k ] )
            vltp_lod_delta_qp_sign[ ltpIndex ][ i ][ k ]                u(1)
        }
      }
  }
}
for( i=0 ; i < subdivisionCount + 1; i++ ) {
```

-continued

```
  if( vltp_lod_quantization_flag[ ltpIndex ] == 1 || i == 0) {
      vltp_log2_lifting_update_weight[ ltpIndex ][ i ]                  ue(v)
      vltp_log2_lifting_prediction_weight[ ltpIndex ][ i ]              ue(v)
  } else {
      vltp_log2_lifting_update_weight[ ltpIndex ][ i ] =
          vltp_log2_lifting_update_weight[ ltpIndex ][ 0 ]
      vltp_log2_lifting_prediction_weight[ ltpIndex ][ i ] =
  vltp_log2_lifting_prediction_weight[ ltpIndex ][ 0 ]
  }
}
for( i=0 ; i < num_offsets; i++ ) {
    <add> vltp_lifting_offsets[ index ][ ltpIndex ][i]                  ue(v)
}</add>
```

In examples, vltp_lifting_offsets[index][ltpIndex][i] represent prediction offsets that are signaled, and num_offsets is 2. Currently, the offsets are signaled and used as its reciprocals. The offsets may be directly signaled as a value instead of $\text{offset}^{-1}$. In some examples, the sequences for which the offset is not used are signaled as 0. In some examples, a flag can be used to enable the offsets for the prediction residuals.

V-DMC encoder 200 and V-DMC decoder 300 may be configured to skip update at the LOD Level. In TMMv5.0, lifting transform parameter set and semantics are as follows:

```
vdmc_lifting_transform_parameters( index, ltpIndex ){
  vdmc_transform_lifting_skip_update_flag[ index ][ ltpIndex ]          u(1)
  vdmc_transform_lod_quantization_flag[ index ][ ltpIndex ]             u(1)
  if( vdmc_transform_lod_quantization_flag[ index ][ ltpIndex ] == 0 ) {
    for( j = 0; j < 3; j++) {
  vdmc_transform_lifting_quantization_parameters[ index ][ ltpIndex ]   ue(v)
[ j ]
  vdmc_transform_log2_lifting_lod_inverse_scale[ index ][ ltpIndex ][ j ue(v)
]
    }
    vdmc_transform_log2_lifting_update_weight[ index ][ ltpIndex ]      ue(v)
  vdmc_transform_log2_lifting_prediction_weight[ index ][ ltpIndex ]    ue(v)
  } else {
    for( i=0 ; i < afps_vdmc_ext_subdivision_iteration_count + 1; i++ ) {
      for( j = 0; j < nunDispComp; j++ ) {
        vdmc_transform_lod_delta_qp[ index ][ ltpIndex ][ i ][ j ]      u(6)
  if ( vdmc_transform_lod_delta_qp[ index ][ ltpIndex ][ i ][ j ] )
  vdmc_transform_lod_delta_qp_sign[ index ][ ltpIndex ][ i ][ j ]       u(1)
      }
    }
  }
}
```

In order to skip update after a certain LOD, an encoder parameter can be added and signaled in two ways. In a first example, if the skip update is enabled, then vdmc_transform_lifting_skip_update_level[index][ltpIndex] indicates the level after which the update in the lifting transform is turned off and can be signaled as shown by the syntax between the delimiters <add> and </add> in the following table.

```
vdmc_lifting_transform_parameters( index, ltpIndex ){
  vdmc_transform_lifting_skip_update_flag[ index ][ ltpIndex ]          u(1)
<add>if(vdmc_transform_lifting_skip_update_flag[ index ][ ltpIndex ] ==
1) {
        vdmc_transform_lifting_skip_update_level[ index ][ ltpIndex ]   ue(v)
    }</add>
  vdmc_transform_lod_quantization_flag[ index ][ ltpIndex ]             u(1)
  if( vdmc_transform_lod_quantization_flag[ index ][ ltpIndex ] == 0 ) {
      for( j = 0; j < 3; j++) {
  vdmc_transform_lifting_quantization_parameters[ index ][ ltpInde      ue(v)
x ][ j ]
```

-continued

```
  vdmc__transform__log2__lifting__lod__inverse__scale[ index ][ ltpIndex ][        ue(v)
j ]
        }
        vdmc__transform__log2__lifting__update__weight[ index ][ ltpIndex ]        ue(v)
  vdmc__transform__log2__lifting__prediction__weight[ index ][ ltpIndex ]          ue(v)
  } else {
  for( i=0 ; i < afps__vdmc__ext__subdivision__iteration__count + 1; i++ ) {
            for( j = 0; j < nunDispComp; j++ ) {
              vdmc__transform__lod__delta__qp[ index ][ ltpIndex ][ i ][ j ]       u(6)
  if ( vdmc__transform__lod__delta__qp[ index ][ ltpIndex ][ i ][ j ] )
  vdmc__transform__lod__delta__qp__sign[ index ][ ltpIndex ][ i ][ j ]             u(1)
            }
        }
    }
}
```

In another example, vdmc_transform_lifting_update_levels[index][ltpIndex] can be used to explicitly signal the total number of updates to be performed as follows:

```
vdmc__lifting__transform__parameters( index, ltpIndex ){
  vdmc__transform__lifting__skip__update__flag[ index ][ ltpIndex ]                  u(1)
  vdmc__transform__lod__quantization__flag[ index ][ ltpIndex ]                      u(1)
        <add>                                                                        ue(v)
vdmc__transform__lifting__update__levels[ index ][ ltpIndex ] </add>
  if( vdmc__transform__lod__quantization__flag[ index ][ ltpIndex ] == 0 ) {
    for( j = 0; j < 3; j++) {
  vdmc__transform__lifting__quantization__parameters[ index ][ ltpInde               ue(v)
x ][ j ]
  vdmc__transform__log2__lifting__lod__inverse__scale[ index ][ ltpIndex ][          ue(v)
j ]
    }
    vdmc__transform__log2__lifting__update__weight[ index ][ ltpIndex ]              ue(v)
  vdmc__transform__log2__lifting__prediction__weight[ index ][ ltpIndex ]            ue(v)
  } else {
  for( i=0 ; i < afps__vdmc__ext__subdivision__iteration__count + 1; i++ ) {
      for( j = 0; j < nunDispComp; j++ ) {
          vdmc__transform__lod__delta__qp[ index ][ ltpIndex ][ i ][ j ]             u(6)
          if ( vdmc__transform__lod__delta__qp[ index ][ ltpIndex ][ i ][ j ] )
  vdmc__transform__lod__delta__qp__sign[ index ][ ltpIndex ][ i ][ j ]               u(1)
      }
    }
  }
}
```

The default value of vdmc_transform_lifting_skip_update_level[index][ltpIndex] and vdmc_transform_lifting_update_levels[index][ltpIndex] is 3 and can range from 0 to maximum LOD. The value set to 0 corresponds to not performing updates at any LOD level, and the value set to a maximum LOD corresponds to performing updates for all the LOD levels.

V-DMC encoder 200 and V-DMC decoder 300 may be configured to update weight signaling at an LOD Level. In the adaptive update weight per LOD as proposed in m64223, the relevant syntax elements are signaled as shown between the delimiters <add> and </add> below:

```
vdmc__lifting__transform__parameters( index, ltpIndex ){
  vdmc__transform__lifting__skip__update__flag[ index ][ ltpIndex ]                  u(1)
  vdmc__transform__lod__quantization__flag[ index ][ ltpIndex ]                      u(1)
  if( vdmc__transform__lod__quantization__flag[ index ][ ltpIndex ] == 0 ) {
    for( j = 0; j < 3; j++) {
  vdmc__transform__lifting__quantization__parameters[ index ][ ltpIndex              ue(v)
][ j ]
  vdmc__transform__log2__lifting__lod__inverse__scale[ index ][ ltpIndex ][          ue(v)
j ]
    }
    vdmc__transform__log2__lifting__update__weight[ index ][ ltpIndex ]              ue(v)
  vdmc__transform__log2__lifting__prediction__weight[ index ][ ltpIndex ]            ue(v)
  } else {
  for( i=0 ; i < afps__vdmc__ext__subdivision__iteration__count + 1; i++ ) {
      for( j = 0; j < nunDispComp; j++ ) {
          vdmc__transform__lod__delta__qp[ index ][ ltpIndex ][ i ][ j ]             u(6)
          if ( vdmc__transform__lod__delta__qp[ index ][ ltpIndex ][ i ][ j ] )
  vdmc__transform__lod__delta__qp__sign[ index ][ ltpIndex ][ i ][ j ]               u(1)
      }
```

-continued

```
      }
    }
    <add>vdmc__transform__lifting__adaptive__update__weight__flag[ index        u(1)
][ ltpIndex ]
        If( vdmc__transform__lifting__adaptive__update__weight__flag[ index
][ ltpIndex ]==0)
      vdmc__transform__lifting__adaptive__update__weight__scale[ index ][       ue(v)
ltpIndex ]      </add>
}
```

Where vdmc_transform_lifting_adaptive_update_weight_flag[index][ltpIndex] equal to 1 indicates adaptive weights will be used for updates in lifting transform using the formula:

```
if (!adaptiveUpdateWeight) {
        const auto d = updateWeight * signal[v];
        signal[v1] += d;
        signal[v2] += d;
    } else {
        const auto d =
          updateWeight
          * pow(adaptiveUpdateWeightScaleValue, (lodCount − it − 2))
          * signal[v];
        signal[v1] += d;
        signal[v2] += d;
```

-continued

```
    }
  }
```

Where adaptiveUpdateWeightScaleValue can be from the range 1.0 to 2.0, lodCount is the total umber of LODs and “it” is the current iteration over the LODs.

If the adaptive update weights are used, the scale value is signaled using vdmc_transform_lifting_adaptive_update_weight_scale[index][ltpIndex].

According to the techniques of this disclosure, the adaptive update weight in the lifting transform may be signaled per LOD as in the following examples:

Example 1

```
vdmc__lifting__transform__parameters( index, ltpIndex ){
  vdmc__transform__lifting__skip__update__flag[ index ][ ltpIndex ]              u(1)
  vdmc__transform__lod__quantization__flag[ index ][ ltpIndex ]                  u(1)
  if( vdmc__transform__lod__quantization__flag[ index ][ ltpIndex ] == 0 ) {
      for( j = 0; j < 3; j++) {
  vdmc__transform__lifting__quantization__parameters[ index ][ ltpIndex ][ j ]   ue(v)
  vdmc__transform__log2__lifting__lod__inverse__scale[ index ][ ltpIndex ][ j ]  ue(v)
      }
    <add> for(i=0; i< afps__vdmc__ext__subdivision__iteration__count; i++ ) {
  vdmc__transform__log2__lifting__adaptive__weight[ index ][ ltpIndex ][j]       ue(v)
        }</add>
  vdmc__transform__log2__lifting__prediction__weight[ index ][ ltpIndex ]        ue(v)
  } else {
      for( i=0 ; i < afps__vdmc__ext__subdivision__iteration__count; i++ ) {
          for( j = 0; j < nunDispComp; j++ ) {
            vdmc__transform__lod__delta__qp[ index ][ ltpIndex ][ i ][ j ]        u(6)
  if ( vdmc__transform__lod__delta__qp[ index ][ ltpIndex ][ i ][ j ] )
  vdmc__transform__lod__delta__qp__sign[ index ][ ltpIndex ][ i ][ j ]           u(1)
          }
      }
  }
}
```

Example 2

```
vdmc__lifting__transform__parameters( index, ltpIndex ){
  vdmc__transform__lifting__skip__update__flag[ index ][ ltpIndex ]              u(1)
  vdmc__transform__lod__quantization__flag[ index ][ ltpIndex ]                  u(1)
  if( vdmc__transform__lod__quantization__flag[ index ][ ltpIndex ] == 0 ) {
    for( j = 0; j < 3; j++) {
  vdmc__transform__lifting__quantization__parameters[ index ][ ltpIndex ][ j ]   ue(v)
  vdmc__transform__log2__lifting__lod__inverse__scale[ index ][ ltpIndex ][ j ]  ue(v)
    }
    vdmc__transform__log2__lifting__update__weight[ index ][ ltpIndex ]          ue(v)
    vdmc__transform__log2__lifting__prediction__weight[ index ][ ltpIndex ]      ue(v)
  } else {
    for( i=0 ; i < afps__vdmc__ext__subdivision__iteration__count + 1; i++ ) {
        for( j = 0; j < nunDispComp; j++ ) {
          vdmc__transform__lod__delta__qp[ index ][ ltpIndex ][ i ][ j ]          u(6)
          if ( vdmc__transform__lod__delta__qp[ index ][ ltpIndex ][ i ][ j ] )
  vdmc__transform__lod__delta__qp__sign[ index ][ ltpIndex ][ i ][ j ]           u(1)
```

-continued

```
        }
      vdmc__transform__log2__lifting__update__weight[ index ][ ltpIndex ][i]       ue(v)
      vdmc__transform__log2__lifting__prediction__weight[ index ][ ltpIndex ]      ue(v)
    }
  }
}
```

A potential advantage of this techniques is that the technique preserves the current signaling approach of the weights, with extension to per LOD signaling.

In some examples, to allow for direct signaling of the value of the adaptive lifting update weight per LoD, the following examples are proposed:

Example 3

```
vdmc__lifting__transform__parameters( index, ltpIndex ){
  vdmc__transform__lifting__skip__update__flag[ index ][ ltpIndex ]                u(1)
  vdmc__transform__lod__quantization__flag[ index ][ ltpIndex ]                    u(1)
  if( vdmc__transform__lod__quantization__flag[ index ][ ltpIndex ] == 0 ) {
    for( j = 0; j < 3; j++) {
  vdmc__transform__lifting__quantization__parameters[ index ][ ltpIndex ][ j ]     ue(v)
  vdmc__transform__log2__lifting__lod__inverse__scale[ index ][ ltpIndex ][ j ]    ue(v)
    }
      <add> for(i=0; i< afps__vdmc__ext__subdivision__iteration__count; i++ ) {
  vdmc__transform__log2__lifting__adaptive__weight__numerator[ index ][ ltpIn      ue(v)
dex ][j]
  vdmc__transform__log2__lifting__adaptive__weight__denominator[ index ][ ltpI
ndex ][j]
          }</add>
    vdmc__transform__log2__lifting__prediction__weight[ index ][ ltpIndex ]        ue(v)
  } else {
    for( i=0 ; i < afps__vdmc__ext__subdivision__iteration__count; i++ ) {
        for( j = 0; j < nunDispComp; j++ ) {
            vdmc__transform__lod__delta__qp[ index ][ ltpIndex ][ i ][ j ]         u(6)
            if ( vdmc__transform__lod__delta__qp[ index ][ ltpIndex ][ i ][ j ] )
  vdmc__transform__lod__delta__qp__sign[ index ][ ltpIndex ][ i ][ j ]             u(1)
        }
    }
  }
}
```

Example 4

```
vdmc__lifting__transform__parameters( index, ltpIndex ){
  vdmc__transform__lifting__skip__update__flag[ index ][ ltpIndex ]                u(1)
  vdmc__transform__lod__quantization__flag[ index ][ ltpIndex ]                    u(1)
  if( vdmc__transform__lod__quantization__flag[ index ][ ltpIndex ] == 0 ) {
    for( j = 0; j < 3; j++) {
      vdmc__transform__lifting__quantization__parameters[ index ][ ltpIndex ][ j ] ue(v)
      vdmc__transform__log2__lifting__lod__inverse__scale[ index ][ ltpIndex ][ j ] ue(v)
    }
    vdmc__transform__log2__lifting__update__weight[ index ][ ltpIndex ]            ue(v)
    vdmc__transform__log2__lifting__prediction__weight[ index ][ ltpIndex ]        ue(v)
  } else {
    for( i=0 ; i < afps__vdmc__ext__subdivision__iteration__count + 1; i++ ) {
      for( j = 0; j < nunDispComp; j++ ) {
        vdmc__transform__lod__delta__qp[ index ][ ltpIndex ][ i ][ j ]             u(6)
        if ( vdmc__transform__lod__delta__qp[ index ][ ltpIndex ][ i ][ j ] )
            vdmc__transform__lod__delta__qp__sign[ index ][ ltpIndex ][ i ][ j ]   u(1)
      }
<add>                                                                              ue(v)
              vdmc__transform__lifting__update__weight__numerator [ index ][ ltp
              Index ][i]
          vdmc__transform__lifting__update__weight__denominator [ index ][ ltpInd  ue(v)
          ex ][i]
```

-continued

```
            vdmc__transform__log2__lifting__prediction__weight[ index ][ ltpIndex ]</    ue(v)
            add>
        }
    }
}
```

According to the techniques of this disclosure, the update weight is signaled as numerator and denominator values to allow for high precision. The liftin update weight can be computed as follows:

Lifting_update_weight[index][ltpIndex]=vdmc_transform_lifting_update_weight_numerator[index][ltpIndex]/vdmc_transform_lifting_update_weight_denominator[index][ltpIndex]

In some examples, the lifting update weight is not explicitly calculated; the numerator and denominator are directly used in the update equation. E.g.,

```
<add>
updateWeightOff = updateWeightDr/2
d[i]   = val < 0 ? −((−val * updateWeightNr +
```

-continued

```
updateWeightOff)/updateWeightDr) : ((val *
updateWeightNr+updateWeightOff)/updateWeightDr);
      </add>
    where updateWeightNr is
vdmc__transform__lifting__update__weight__numerator [ index ][ ltpIndex
] and updateWeightDr is
vdmc__transform__lifting__update__weight__denominator [ index ][
ltpIndex ]. Note that the above example may be combined with an
updated weight offset.
```

To incorporate for both cases when vdmc_transform_lod_quantizatinon_flag[index][ltpIndex] equals 0 and 1, the following examples are proposed.

Example 5

```
vdmc__lifting__transform__parameters( index, ltpIndex ){
  vdmc__transform__lifting__skip__update__flag[ index ][ ltpIndex ]                       u(1)
  vdmc__transform__lod__quantization__flag[ index ][ ltpIndex ]                           u(1)
  if( vdmc__transform__lod__quantization__flag[ index ][ ltpIndex ] == 0 ) {
      for( j = 0; j < 3; j++) {
  vdmc__transform__lifting__quantization__parameters[ index ][ ltpIndex ][ j ]            ue(v)
  vdmc__transform__log2__lifting__lod__inverse__scale[ index ][ ltpIndex ][ j ]           ue(v)
        }
        <del>vdmc__transform__log2__lifting__update__weight[ index ][ ltpIndex ][j]       ue(v)
        vdmc__transform__log2__lifting__prediction__weight[ index ][ ltpIndex ] </del>    ue(v)
  } else {
        for( i=0 ; i < afps__vdmc__ext__subdivision__iteration__count; i++ ) {
            for( j = 0; j < nunDispComp; j++ ) {
              vdmc__transform__lod__delta__qp[ index ][ ltpIndex ][ i ][ j ]              u(6)
              if ( vdmc__transform__lod__delta__qp[ index ][ ltpIndex ][ i ][ j ] )
                vdmc__transform__lod__delta__qp__sign[ index ][ ltpIndex ][ i ][ j ]      u(1)
            }
        }
    }
        <add>for(i=0; i< afps__vdmc__ext__subdivision__iteration__count; i++ ) {
          vdmc__transform__log2__lifting__adaptive__weight[ index ][ ltpIndex ][j]        ue(v)
        }
          vdmc__transform__log2__lifting__prediction__weight[ index ][ ltpIndex ] </add>  ue(v)
}
```

Example 6

```
vdmc__lifting__transform__parameters( index, ltpIndex ){
  vdmc__transform__lifting__skip__update__flag[ index ][ ltpIndex ]                       u(1)
  vdmc__transform__lod__quantization__flag[ index ][ ltpIndex ]                           u(1)
  if( vdmc__transform__lod__quantization__flag[ index ][ ltpIndex ] == 0 ) {
    for( j = 0; j < 3; j++) {
  vdmc__transform__lifting__quantization__parameters[ index ][ ltpIndex ][ j ]            ue(v)
  vdmc__transform__log2__lifting__lod__inverse__scale[ index ][ ltpIndex ][ j ]           ue(v)
    }
<del>vdmc__transform__log2__lifting__update__weight[ index ][ ltpIndex ][j]                 ue(v)
    vdmc__transform__log2__lifting__prediction__weight[ index ][ ltpIndex ] </del>        ue(v)
  } else {
    for( i=0 ; i < afps__vdmc__ext__subdivision__iteration__count; i++ ) {
          for( j = 0; j < nunDispComp; j++ ) {
            vdmc__transform__lod__delta__qp[ index ][ ltpIndex ][ i ][ j ]                u(6)
            if ( vdmc__transform__lod__delta__qp[ index ][ ltpIndex ][ i ][ j ] )
              vdmc__transform__lod__delta__qp__sign[ index ][ ltpIndex ][ i ][ j ]        u(1)
          }
```

-continued

```
    }
  }
      <add>for(i=0; i< afps_vdmc_ext_subdivision_iteration_count; i++ ) {
  vdmc_transform_log2_lifting_adaptive_weight_numerator[ index ][ ltpIndex ][j]   ue(v)
  vdmc_transform_log2_lifting_adaptive_weight_denominator[ index ][ ltpIndex ][j]
        }
    vdmc_transform_log2_lifting_prediction_weight[ index ][ ltpIndex ] </add>      ue(v)
}
```

Example 7

An encoding parameter can be added to enable adaptive update weights in lifting transform to provide the flexibility to switch between fixed and adaptive update weight approaches. This flexibility could be used for any of the examples mentioned in this section. The extension of this flexibility is demonstrated on top of Example 6 as follows:

```
vdmc_lifting_transform_parameters( index, ltpIndex ){
vdmc_transform_lifting_skip_update_flag[ index ][ ltpIndex ]                     u(1)
vdmc_transform_lod_quantization_flag[ index ][ ltpIndex ]                        u(1)
if( vdmc_transform_lod_quantization_flag[ index ][ ltpIndex ] == 0 ) {
    for( j = 0; j < 3; j++) {
vdmc_transform_lifting_quantization_parameters[ index ][ ltpIndex ][ j ]         ue(v)
vdmc_transform_log2_lifting_lod_inverse_scale[ index ][ ltpIndex ][ j ]          ue(v)
    }
<del>  vdmc_transform_log2_lifting_update_weight[ index ][ ltpIndex ]               ue(v)
    vdmc_transform_log2_lifting_prediction_weight[ index ][ ltpIndex ] </del>      ue(v)
} else {
    for( i=0 ; i < afps_vdmc_ext_subdivision_iteration_count; i++ ) {
        for( j = 0; j < nunDispComp; j++ ) {
            vdmc_transform_lod_delta_qp[ index ][ ltpIndex ][ i ][ j ]             u(6)
            if ( vdmc_transform_lod_delta_qp[ index ][ ltpIndex ][ i ][ j ] )
               vdmc_transform_lod_delta_qp_sign[ index ][ ltpIndex ][ i ][ j ]     u(1)
        }
    }
}
    <add>  If (vdmc_transform_lifting_adaptive_update_weight_flag[ index ][
ltpIndex ]==1){
       for(i=0; i< afps_vdmc_ext_subdivision_iteration_count; i++ ) {
    vdmc_transform_log2_lifting_adaptive_weight_numerator[ index ][ ltpIndex ][j]  ue(v)
vdmc_transform_log2_lifting_adaptive_weight_denominator[ index ][ ltpIndex ][j]
         }
       }
       else
            vdmc_transform_log2_lifting_update_weight[ index ][ ltpIndex ]
  vdmc_transform_log2_lifting_prediction_weight[ index ][ ltpIndex ] </add>         ue(v)
}
```

Figure 12:
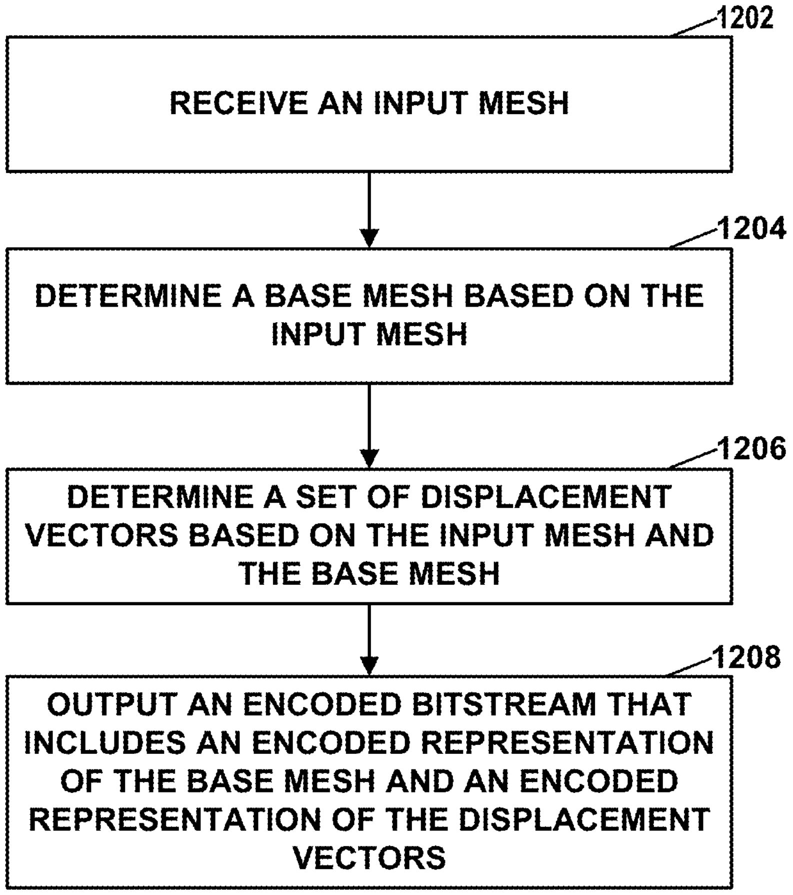
FIG. 12 is a flowchart illustrating an example process for encoding a mesh.

FIG. 12 is a flowchart illustrating an example process for encoding a mesh. Although described with respect to V-DMC encoder 200 (FIGS. 1 and 2), it should be understood that other devices may be configured to perform a process similar to that of FIG. 12.

In the example of FIG. 12, V-DMC encoder 200 receives an input mesh (1202). V-DMC encoder 200 determines a base mesh based on the input mesh (1204). V-DMC encoder 200 determines a set of displacement vectors based on the input mesh and the base mesh (1206). V-DMC encoder 200 outputs an encoded bitstream that includes an encoded representation of the base mesh and an encoded representation of the displacement vectors (1208). V-DMC encoder 200 may additionally determine attribute values from the input mesh and include an encoded representation of the attribute values vectors in the encoded bitstream.

Figure 13:
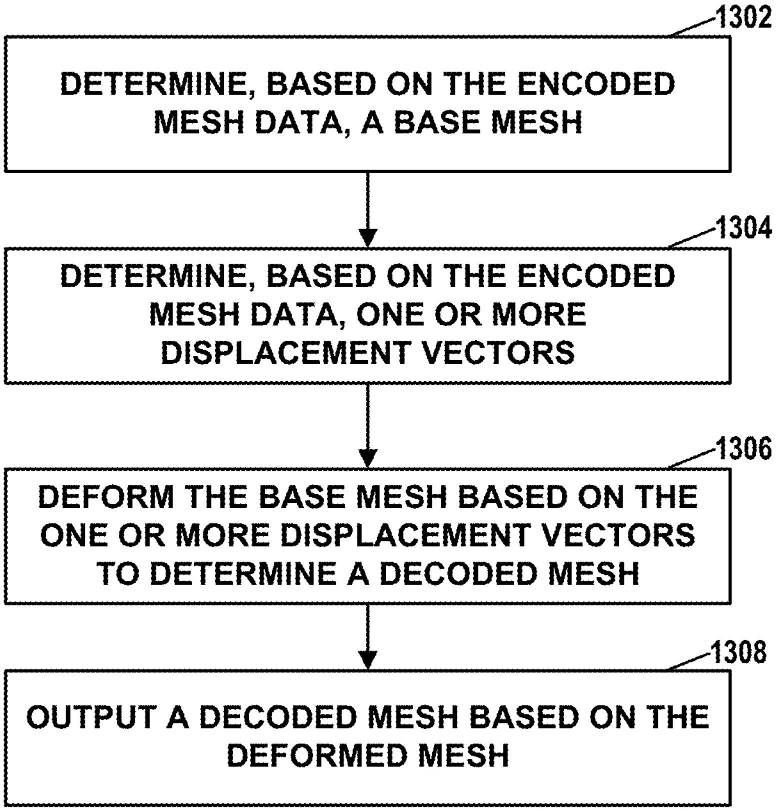
FIG. 13 is a flowchart illustrating an example process for decoding a compressed bitstream of mesh data.

FIG. 13 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 13.

In the example of FIG. 13, V-DMC decoder 300 determines, based on the encoded mesh data, a base mesh (1302). V-DMC decoder 300 determines, based on the encoded mesh data, one or more displacement vectors (1304). V-DMC decoder 300 deforms the base mesh using the one or more displacement vectors (1306). For example, the base mesh may have a first set of vertices, and V-DMC decoder 300 may subdivide the base mesh to determine an additional set of vertices for the base mesh. To deform the base mesh, V-DMC decoder 300 may modify the locations of the additional set of vertices based on the one or more displacement vectors. V-DMC decoder 300 outputs a decoded mesh based on the deformed mesh (1308). V-DMC decoder 300 may, for example, output the decoded mesh for storage, transmission, or display.

Figure 14:
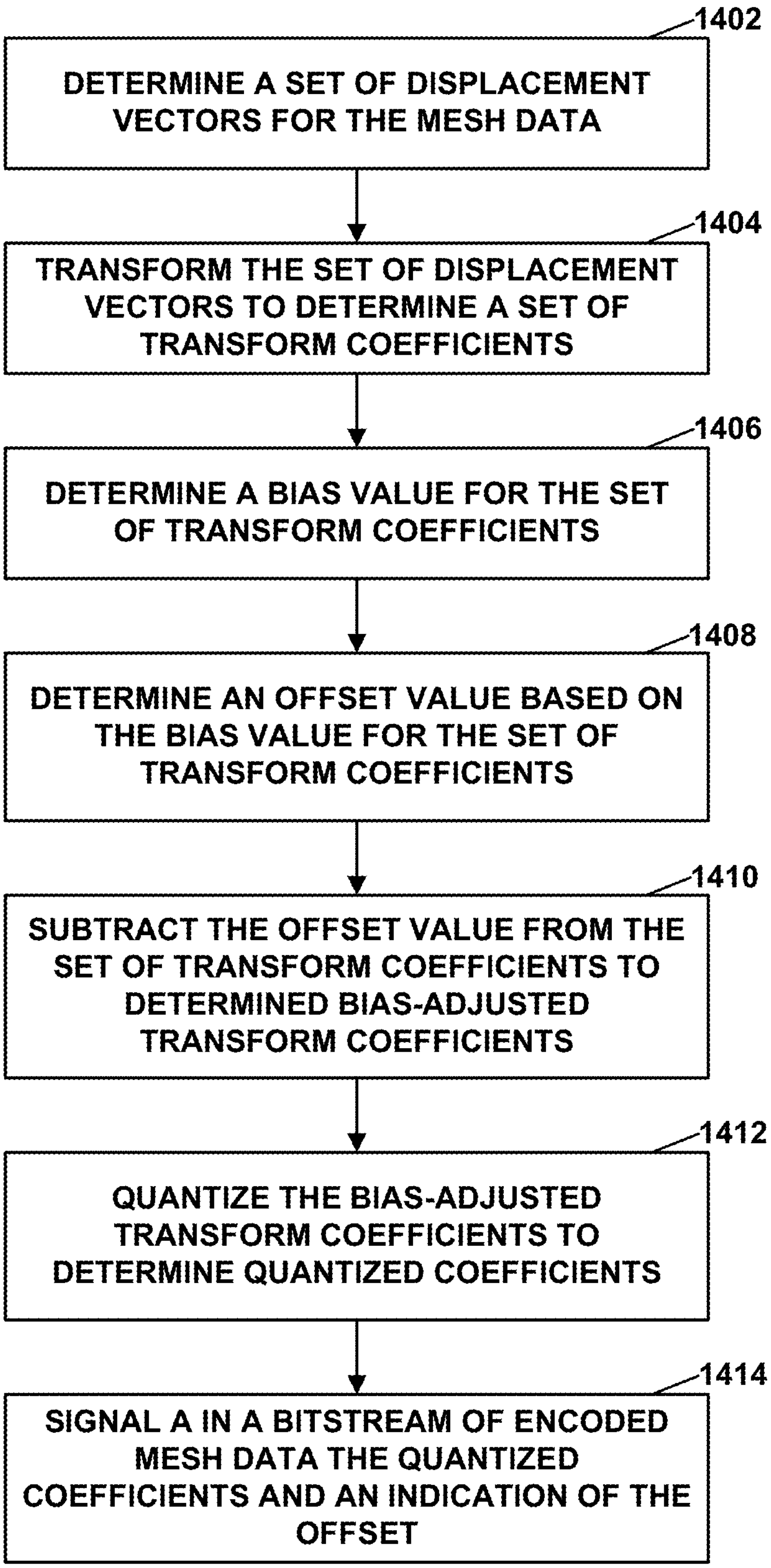
FIG. 14 is a flowchart illustrating an example process for encoding a mesh.

FIG. 14 is a flowchart illustrating an example process for encoding a mesh. Although described with respect to V-DMC encoder 200 (FIGS. 1 and 2), it should be understood that other devices may be configured to perform a process similar to that of FIG. 14.

In the example of FIG. 14, V-DMC encoder 200 determines a set of displacement vectors for the mesh data (1402). V-DMC encoder 200 transforms the set of displacement vectors to determine a set of transform coefficients (1404). To transform the set of displacement vectors V-DMC encoder 200 be further configured to apply a wavelet transform with a lifting scheme, as described above. V-DMC encoder 200 determines a bias value for the set of transform coefficients (1406). To determine the bias value for the set of transform coefficients, V-DMC encoder 200 may be configured to determine the bias values for values of a normal component of the set of displacement vectors. V-DMC encoder 200 determines an offset value based on the bias value for the set of transform coefficients (1408). V-DMC encoder 200 subtracts the offset value from the set of transform coefficients to determined bias-adjusted transform coefficients (1410). V-DMC encoder 200 quantizes the bias-adjusted transform coefficients to determine quantized coefficients (1412). V-DMC encoder 200 signals a in a bitstream of encoded mesh data the quantized coefficients and an indication of the offset (1414).

Figure 15:
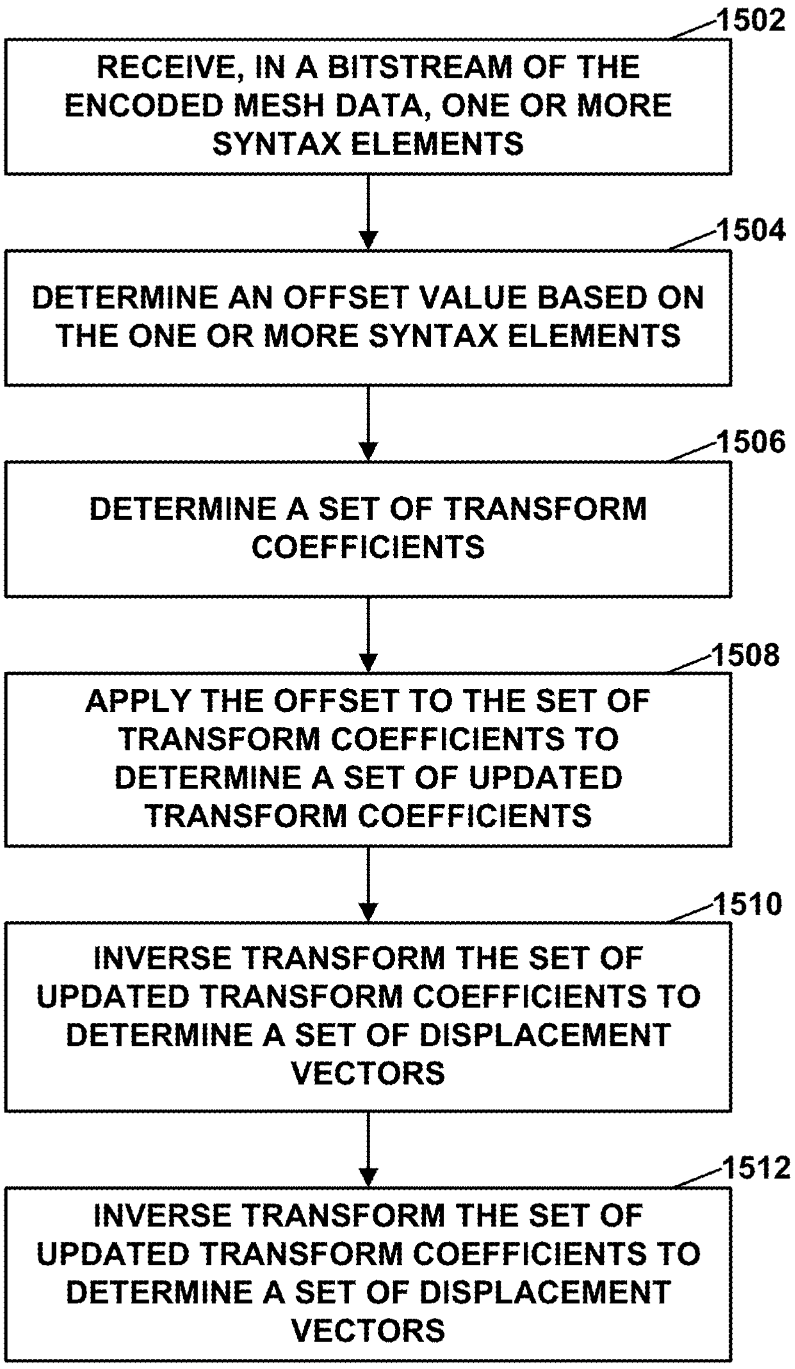
FIG. 15 is a flowchart illustrating an example process for decoding a compressed bitstream of mesh data.

FIG. 15 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 15.

In the example of FIG. 15, V-DMC decoder 300 determines an offset value based on the one or more syntax elements (1404). V-DMC decoder 300 may, for example, extract a displacement bitstream from the bitstream of the encoded mesh data and receive the one or more syntax elements in the displacement bitstream.

V-DMC decoder 300 determines a set of transform coefficients (1406). To determine the set of transform coefficients, V-DMC decoder 300 may, for example receive a set of quantized transform coefficients and dequantize the set of quantized transform coefficients to determine the set of transform coefficients.

V-DMC decoder 300 applies the offset to the set of transform coefficients to determine a set of updated transform coefficients (1408). To apply the offset to the set of transform coefficients to determine the set of updated transform coefficients, V-DMC decoder 300 may add the offset to each coefficient of the set of transform coefficients.

V-DMC decoder 300 inverse transforms the set of updated transform coefficients to determine a set of displacement vectors (1410). To inverse transform the set of updated transform coefficients, V-DMC decoder 300 may apply an inverse lifting transform as described above. To inverse transform the set of updated transform coefficients to determine the set of displacement vectors, V-DMC decoder 300 may inverse transform the set of updated transform coefficients to determine values for a normal component of the set of displacement vectors.

V-DMC decoder 300 determines a decoded mesh based on the set of displacement vectors (1412). To determine the decoded mesh, V-DMC decoder 300 may be configured to determine, from the bitstream of the encoded mesh data, a base mesh with a first set of vertices; subdivide the base mesh to determine an additional set of vertices for the base mesh; deform the base mesh, wherein deforming the base mesh comprises modifying locations of the additional set of vertices based on the one or more displacement vectors; and determine the decoded mesh based on the deformed base mesh.

The first set of vertices may correspond to a highest level of detail (e.g., LOD0) and the additional vertices correspond to lower levels of detail (e.g., LOD1 to LODN, with N being greater than or equal to 2). V-DMC decoder 300 may be configured to determine a respective offset value for each level of the lower levels of detail; determine a respective set of transform coefficients for each level of the lower levels of detail; apply the respective offset for each level of the lower levels of detail to the corresponding respective set of transform coefficients for each level of the lower levels of detail to determine a respective set of updated transform coefficients for each level of the lower levels of detail; inverse transform the respective set of updated transform coefficients for each level of the lower levels of detail to determine a respective set of displacement vectors for each level of the lower levels of detail; and determine the decoded mesh based on the respective set of displacement vectors for each level of the lower levels of detail. To determine the respective offset value for each level of the lower levels of detail, V-DMC decoder 300 may be configured to receive a respective syntax for each level of the lower levels of detail.

The following numbered clauses illustrate one or more aspects of the devices and techniques described in this disclosure.

Clause 1A: A method of processing mesh data, the method comprising: any technique or combination of techniques described in this disclosure.

Clause 2A: The method of any of clause 1, further comprising generating the mesh data.

Clause 3A: A device for processing mesh data, the device comprising: a memory configured to store the mesh data; and one or more processors coupled to the memory, implemented in circuitry, and configured to perform any technique or combination of techniques described in this disclosure.

Clause 4A: The device clause 3A, wherein the device comprises a decoder.

Clause 5A: The device of clause 3A, wherein the device comprises an encoder.

Clause 6A: The device of any of clauses 3A-4, further comprising a device to generate the mesh data.

Clause 7A: The device of any of clauses 3A-6, further comprising a display to present imagery based on data.

Clause 8A: A computer-readable storage medium having stored thereon instructions that, when executed, cause one or more processors to perform any technique or combination of techniques described in this disclosure.

Clause 1B: A device for decoding encoded mesh data, the device comprising: a memory; processing circuitry coupled to the memory and configured to: receive, in a bitstream of the encoded mesh data, one or more syntax elements; determine an offset value based on the one or more syntax elements; determine a set of transform coefficients; apply the offset to the set of transform coefficients to determine a set of updated transform coefficients; inverse transform the set of updated transform coefficients to determine a set of displacement vectors; and determine a decoded mesh based on the set of displacement vectors.

Clause 2B: The device of clause 1B, wherein to inverse transform the set of updated transform coefficients, the processing circuitry is further configured to apply an inverse lifting transform.

Clause 3B: The device of clause 1B or 2B, wherein to inverse transform the set of updated transform coefficients to determine the set of displacement vectors, the processing circuitry is configured to inverse transform the set of updated transform coefficients to determine values for a normal component of the set of displacement vectors.

Clause 4B: The device of any of clauses 1B-3B, wherein to apply the offset to the set of transform coefficients to determine the set of updated transform coefficients, the processing circuitry is configured to add the offset to each coefficient of the set of transform coefficients.

Clause 5B: The device of any of clauses 1B-4B, wherein to determine the decoded mesh, the processing circuitry is configured to: determine, from the bitstream of the encoded mesh data, a base mesh with a first set of vertices; subdivide the base mesh to determine an additional set of vertices for the base mesh; deform the base mesh, wherein deforming the base mesh comprises modifying locations of the additional set of vertices based on the one or more displacement vectors; and determine the decoded mesh based on the deformed base mesh.

Clause 6B: The device of clause 5B, wherein the first set of vertices correspond to a highest level of detail and the additional vertices correspond to lower levels of detail, and the processing circuitry is further configured to: determine a respective offset value for each level of the lower levels of detail; determine a respective set of transform coefficients for each level of the lower levels of detail; apply the respective offset for each level of the lower levels of detail to the corresponding respective set of transform coefficients for each level of the lower levels of detail to determine a respective set of updated transform coefficients for each level of the lower levels of detail; inverse transform the respective set of updated transform coefficients for each level of the lower levels of detail to determine a respective set of displacement vectors for each level of the lower levels of detail; and determine the decoded mesh based on the respective set of displacement vectors for each level of the lower levels of detail.

Clause 7B: The device of clause 6B, wherein to determine the respective offset value for each level of the lower levels of detail, the processing circuitry is further configured to receive a respective syntax for each level of the lower levels of detail.

Clause 8B: The device of any of clauses 1B-7B, wherein to determine the set of transform coefficients, the processing circuitry is configured to: receive a set of quantized transform coefficients; and dequantize the set of quantized transform coefficients to determine the set of transform coefficients.

Clause 9B: The device of any of clauses 1B-8B, wherein the processing circuitry is configured to: extract a displacement bitstream from the bitstream of the encoded mesh data; and receive the one or more syntax elements in the displacement bitstream.

Clause 10B: A method of decoding encoded mesh data, the method comprising: receiving, in a bitstream of the encoded mesh data, one or more syntax elements; determining an offset value based on the one or more syntax elements; determining a set of transform coefficients; applying the offset to the set of transform coefficients to determine a set of updated transform coefficients; inverse transforming the set of updated transform coefficients to determine a set of displacement vectors; and determining a decoded mesh based on the set of displacement vectors.

Clause 11B: The method of clause 10B, wherein inverse transforming the set of updated transform coefficients comprises applying an inverse lifting transform to the set of transform coefficients.

Clause 12B: The method of clause 10B or 11B, wherein inverse transforming the set of updated transform coefficients to determine the set of displacement vectors comprises inverse transforming the set of updated transform coefficients to determine values for a normal component of the set of displacement vectors.

Clause 13B: The method of any of clauses 10B-12B, wherein applying the offset to the set of transform coefficients to determine the set of updated transform coefficients comprises adding the offset to each coefficient of the set of transform coefficients.

Clause 14B: The method of any of clauses 10B-13B, wherein determining the decoded mesh comprises: determining, from the bitstream of the encoded mesh data, a base mesh with a first set of vertices; subdividing the base mesh to determine an additional set of vertices for the base mesh; deforming the base mesh, wherein deforming the base mesh comprises modifying locations of the additional set of vertices based on the one or more displacement vectors; and determining the decoded mesh based on the deformed base mesh.

Clause 15B: The method of clause 14B, wherein the first set of vertices correspond to a highest level of detail and the additional vertices correspond to lower levels of detail, and the method further comprising: determining a respective offset value for each level of the lower levels of detail; determining a respective set of transform coefficients for each level of the lower levels of detail; applying the respective offset for each level of the lower levels of detail to the corresponding respective set of transform coefficients for each level of the lower levels of detail to determine a respective set of updated transform coefficients for each level of the lower levels of detail; inverse transforming the respective set of updated transform coefficients for each level of the lower levels of detail to determine a respective set of displacement vectors for each level of the lower levels of detail; and determining the decoded mesh based on the respective set of displacement vectors for each level of the lower levels of detail.

Clause 16B: The method of clause 15B, wherein determine the respective offset value for each level of the lower levels of detail comprises receiving a respective syntax for each level of the lower levels of detail.

Clause 17B: The method of any of clauses 10B-16B, wherein determining the set of transform coefficients comprises: receiving a set of quantized transform coefficients; and dequantizing the set of quantized transform coefficients to determine the set of transform coefficients.

Clause 18B: The method of any of clauses 10B-17B, further comprising: extracting a displacement bitstream from the bitstream of the encoded mesh data; and receiving the one or more syntax elements in the displacement bitstream.

Clause 19B: A device for encoding mesh data, the device comprising: a memory; processing circuitry coupled to the memory and configured to: determine a set of displacement vectors for the mesh data; transform the set of displacement vectors to determine a set of transform coefficients; determine a bias value for the set of transform coefficients; determine an offset value based on the bias value for the set of transform coefficients; subtract the offset value from the set of transform coefficients to determined bias-adjusted transform coefficients; quantize the bias-adjusted transform coefficients to determine quantized coefficients; and signal a in a bitstream of encoded mesh data the quantized coefficients and an indication of the offset.

Clause 20B: The device of clause 19B, wherein to transform the set of displacement vectors, the processing circuitry is further configured to apply a wavelet transform with a lifting scheme.

Clause 21B: The device of clause 19B or 20B, wherein to determine the bias value for the set of transform coefficients, the processing circuitry is further configured to determine the bias values for values of a normal component of the set of displacement vectors.

Clause 22B: The device of any of clauses 19B-21B, wherein to determine the set of displacement vectors for the mesh data, the processing circuitry is further configured to: receive an input mesh; determine a base mesh based on the input mesh, wherein the base mesh includes a first set of vertices; determine a subdivided mesh, wherein the subdivided mesh includes an additional set of vertices; determine a first set of displacement vectors for the first set of vertices and a second set of displacement vectors for the additional set of vertices based on the input mesh and the base mesh; and output an encoded bitstream that includes an encoded representation of the base mesh and an encoded representation of the displacement vectors.

Clause 23B: The device of clause 22B, wherein the first set of vertices correspond to a highest level of detail and the additional vertices correspond to lower levels of detail, wherein to determine the bias value for the set of transform coefficients, the processing circuitry is further configured to determine the bias value for one of the lower levels of detail, and to determine the offset value based on the bias value for the set of transform coefficients, the processing circuitry is further configured to determine the offset value for the one of the lower levels of detail.

Clause 24B: The device of clause 23B, wherein the processing circuitry is further configured to: determine a respective bias value for a respective set of transform coefficients for each of the lower levels of detail; determine a respective offset value based on the respective bias value for each respective set of transform coefficients; subtract the respective offset value from the respective set of transform coefficients to determine respective bias-adjusted transform coefficients for each respective set of transform coefficients; quantize the respective bias-adjusted transform coefficients to determine respective quantized coefficients for each respective set of transform coefficients; and signal a in the bitstream of encoded mesh data the indications of the respective quantized coefficients and indications of the respective offsets.

Clause 25B: A method of encoding mesh data, the method comprising: determining a set of displacement vectors for the mesh data; transforming the set of displacement vectors to determine a set of transform coefficients; determining a bias value for the set of transform coefficients; determining an offset value based on the bias value for the set of transform coefficients; subtracting the offset value from the set of transform coefficients to determined bias-adjusted transform coefficients; quantizing the bias-adjusted transform coefficients to determine quantized coefficients; and signaling a in a bitstream of encoded mesh data the quantized coefficients and an indication of the offset.

Clause 26B: The method of clause 25B, wherein transforming the set of displacement vectors comprises applying a wavelet transform with a lifting scheme.

Clause 27B: The method of clause 25B or 26B, wherein determining the bias value for the set of transform coefficients comprises determining the bias values for values of a normal component of the set of displacement vectors.

Clause 28B: The method of any of clauses 25B-27B, wherein determining the set of displacement vectors for the mesh data comprises: receiving an input mesh; determining a base mesh based on the input mesh, wherein the base mesh includes a first set of vertices; determining a subdivided mesh, wherein the subdivided mesh includes an additional set of vertices; determining a first set of displacement vectors for the first set of vertices and a second set of displacement vectors for the additional set of vertices based on the input mesh and the base mesh; and outputting an encoded bitstream that includes an encoded representation of the base mesh and an encoded representation of the displacement vectors.

Clause 29B: The method of clause 28B, wherein the first set of vertices correspond to a highest level of detail and the additional vertices correspond to lower levels of detail, wherein determining the bias value for the set of transform coefficients comprises determining the bias value for one of the lower levels of detail, and determining the offset value based on the bias value for the set of transform coefficients comprises determining the offset value for the one of the lower levels of detail.

Clause 30B: The method of clause 29B, further comprising: determining a respective bias value for a respective set of transform coefficients for each of the lower levels of detail; determining a respective offset value based on the respective bias value for each respective set of transform coefficients; subtracting the respective offset value from the respective set of transform coefficients to determine respective bias-adjusted transform coefficients for each respective set of transform coefficients; quantizing the respective bias-adjusted transform coefficients to determine respective quantized coefficients for each respective set of transform coefficients; and signaling a in the bitstream of encoded mesh data the indications of the respective quantized coefficients and indications of the respective offsets.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded mesh data, the device comprising:
- a memory; and
- processing circuitry coupled to the memory and configured to:
  - receive, in a bitstream of the encoded mesh data, one or more syntax elements;
  - determine an offset value based on the one or more syntax elements;
  - determine a set of transform coefficients;
  - apply the offset to the set of transform coefficients to determine a set of updated transform coefficients;
  - inverse transform the set of updated transform coefficients to determine a set of displacement vectors; and
  - determine a decoded mesh based on the set of displacement vectors.

2. The device of claim 1, wherein to inverse transform the set of updated transform coefficients, the processing circuitry is further configured to apply an inverse lifting transform.

3. The device of claim 1, wherein to inverse transform the set of updated transform coefficients to determine the set of displacement vectors, the processing circuitry is configured to inverse transform the set of updated transform coefficients to determine values for a normal component of the set of displacement vectors.

4. The device of claim 1, wherein to apply the offset to the set of transform coefficients to determine the set of updated transform coefficients, the processing circuitry is configured to add the offset to each coefficient of the set of transform coefficients.

5. The device of claim 1, wherein to determine the decoded mesh, the processing circuitry is configured to:
- determine, from the bitstream of the encoded mesh data, a base mesh with a first set of vertices;
- subdivide the base mesh to determine an additional set of vertices for the base mesh;
- deform the base mesh, wherein deforming the base mesh comprises modifying locations of the additional set of vertices based on the one or more displacement vectors; and
- determine the decoded mesh based on the deformed base mesh.

6. The device of claim 5, wherein the first set of vertices correspond to a highest level of detail and the additional vertices correspond to lower levels of detail, and the processing circuitry is further configured to:
- determine a respective offset value for each level of the lower levels of detail;
- determine a respective set of transform coefficients for each level of the lower levels of detail;
- apply the respective offset for each level of the lower levels of detail to the corresponding respective set of transform coefficients for each level of the lower levels of detail to determine a respective set of updated transform coefficients for each level of the lower levels of detail;
- inverse transform the respective set of updated transform coefficients for each level of the lower levels of detail to determine a respective set of displacement vectors for each level of the lower levels of detail; and
- determine the decoded mesh based on the respective set of displacement vectors for each level of the lower levels of detail.

7. The device of claim 6, wherein to determine the respective offset value for each level of the lower levels of detail, the processing circuitry is further configured to receive a respective syntax for each level of the lower levels of detail.

8. The device of claim 1, wherein to determine the set of transform coefficients, the processing circuitry is configured to:
- receive a set of quantized transform coefficients; and
- dequantize the set of quantized transform coefficients to determine the set of transform coefficients.

9. The device of claim 1, wherein the processing circuitry is configured to:
- extract a displacement bitstream from the bitstream of the encoded mesh data; and
- receive the one or more syntax elements in the displacement bitstream.

10. The device of claim 1, further comprising:
- a display configured to display the decoded mesh.

11. A method of decoding encoded mesh data, the method comprising:
- receiving, in a bitstream of the encoded mesh data, one or more syntax elements;
- determining an offset value based on the one or more syntax elements;

determining a set of transform coefficients;

applying the offset to the set of transform coefficients to determine a set of updated transform coefficients;

inverse transforming the set of updated transform coefficients to determine a set of displacement vectors; and determining a decoded mesh based on the set of displacement vectors.

12. The method of claim 11, wherein inverse transforming the set of updated transform coefficients comprises applying an inverse lifting transform to the set of transform coefficients.

13. The method of claim 11, wherein inverse transforming the set of updated transform coefficients to determine the set of displacement vectors comprises inverse transforming the set of updated transform coefficients to determine values for a normal component of the set of displacement vectors.

14. The method of claim 11, wherein applying the offset to the set of transform coefficients to determine the set of updated transform coefficients comprises adding the offset to each coefficient of the set of transform coefficients.

15. The method of claim 11, wherein determining the decoded mesh comprises:

determining, from the bitstream of the encoded mesh data, a base mesh with a first set of vertices;

subdividing the base mesh to determine an additional set of vertices for the base mesh;

deforming the base mesh, wherein deforming the base mesh comprises modifying locations of the additional set of vertices based on the one or more displacement vectors; and determining the decoded mesh based on the deformed base mesh.

16. The method of claim 15, wherein the first set of vertices correspond to a highest level of detail and the additional vertices correspond to lower levels of detail, and the method further comprising:

determining a respective offset value for each level of the lower levels of detail;

determining a respective set of transform coefficients for each level of the lower levels of detail;

applying the respective offset for each level of the lower levels of detail to the corresponding respective set of transform coefficients for each level of the lower levels of detail to determine a respective set of updated transform coefficients for each level of the lower levels of detail;

inverse transforming the respective set of updated transform coefficients for each level of the lower levels of detail to determine a respective set of displacement vectors for each level of the lower levels of detail; and determining the decoded mesh based on the respective set of displacement vectors for each level of the lower levels of detail.

17. The method of claim 16, wherein determining the respective offset value for each level of the lower levels of detail comprises receiving a respective syntax for each level of the lower levels of detail.

18. The method of claim 11, wherein determining the set of transform coefficients comprises:

receiving a set of quantized transform coefficients; and dequantizing the set of quantized transform coefficients to determine the set of transform coefficients.

19. The method of claim 11, further comprising:

extracting a displacement bitstream from the bitstream of the encoded mesh data; and receiving the one or more syntax elements in the displacement bitstream.

20. A device for encoding mesh data, the device comprising:

a memory;

processing circuitry coupled to the memory and configured to:

determine a set of displacement vectors for the mesh data;

transform the set of displacement vectors to determine a set of transform coefficients;

determine a bias value for the set of transform coefficients;

determine an offset value based on the bias value for the set of transform coefficients;

subtract the offset value from the set of transform coefficients to determine bias-adjusted transform coefficients;

quantize the bias-adjusted transform coefficients to determine quantized coefficients; and signal the quantized coefficients and an indication of the offset in a bitstream of encoded mesh data.

21. The device of claim 20, wherein to transform the set of displacement vectors, the processing circuitry is further configured to apply a wavelet transform with a lifting scheme.

22. The device of claim 20, wherein to determine the bias value for the set of transform coefficients, the processing circuitry is further configured to determine the bias values for values of a normal component of the set of displacement vectors.

23. The device of claim 20, wherein to determine the set of displacement vectors for the mesh data, the processing circuitry is further configured to:

receive an input mesh;

determine a base mesh based on the input mesh, wherein the base mesh includes a first set of vertices;

determine a subdivided mesh, wherein the subdivided mesh includes an additional set of vertices;

determine a first set of displacement vectors for the first set of vertices and a second set of displacement vectors for the additional set of vertices based on the input mesh and the base mesh; and output an encoded bitstream that includes an encoded representation of the base mesh and an encoded representation of the displacement vectors.

24. The device of claim 23, further comprising:

a graphics engine configured to generate the input mesh.

25. The device of claim 23, wherein the first set of vertices correspond to a highest level of detail and the additional vertices correspond to lower levels of detail, wherein to determine the bias value for the set of transform coefficients, the processing circuitry is further configured to determine the bias value for one of the lower levels of detail, and to determine the offset value based on the bias value for the set of transform coefficients, the processing circuitry is further configured to determine the offset value for the one of the lower levels of detail.

26. The device of claim 25, wherein the processing circuitry is further configured to:

determine a respective bias value for a respective set of transform coefficients for each of the lower levels of detail;

determine a respective offset value based on the respective bias value for each respective set of transform coefficients;

subtract the respective offset value from the respective set of transform coefficients to determine respective bias-adjusted transform coefficients for each respective set of transform coefficients;

quantize the respective bias-adjusted transform coefficients to determine respective quantized coefficients for each respective set of transform coefficients; and signal the indications of the respective quantized coefficients and indications of the respective offsets in the bitstream of encoded mesh data.

27. A method of encoding mesh data, the method comprising:

determining a set of displacement vectors for the mesh data;

transforming the set of displacement vectors to determine a set of transform coefficients;

determining a bias value for the set of transform coefficients;

determining an offset value based on the bias value for the set of transform coefficients;

subtracting the offset value from the set of transform coefficients to determine bias-adjusted transform coefficients;

quantizing the bias-adjusted transform coefficients to determine quantized coefficients; and signal the quantized coefficients and an indication of the offset in a bitstream of encoded mesh data.

28. The method of claim 27, wherein determining the set of displacement vectors for the mesh data comprises:

receiving an input mesh;

determining a base mesh based on the input mesh, wherein the base mesh includes a first set of vertices;

determining a subdivided mesh, wherein the subdivided mesh includes an additional set of vertices;

determining a first set of displacement vectors for the first set of vertices and a second set of displacement vectors for the additional set of vertices based on the input mesh and the base mesh; and outputting an encoded bitstream that includes an encoded representation of the base mesh and an encoded representation of the displacement vectors.

29. The method of claim 28, wherein the first set of vertices correspond to a highest level of detail and the additional vertices correspond to lower levels of detail, wherein determining the bias value for the set of transform coefficients comprises determining the bias value for one of the lower levels of detail, and determining the offset value based on the bias value for the set of transform coefficients comprises determining the offset value for the one of the lower levels of detail.

30. The method of claim 29, further comprising:

determining a respective bias value for a respective set of transform coefficients for each of the lower levels of detail;

determining a respective offset value based on the respective bias value for each respective set of transform coefficients;

subtracting the respective offset value from the respective set of transform coefficients to determine respective bias-adjusted transform coefficients for each respective set of transform coefficients;

quantizing the respective bias-adjusted transform coefficients to determine respective quantized coefficients for each respective set of transform coefficients; and signaling the indications of the respective quantized coefficients and indications of the respective offsets in the bitstream of encoded mesh data.

* * * * *